(12) United States Patent
Zhang et al.

(10) Patent No.: US 12,407,386 B2
(45) Date of Patent: Sep. 2, 2025

(54) BROADBAND MILLIMETER WAVE BEAM TRACKING METHOD BASED ON VEHICLE MOTION TRAJECTORY COGNITION

(71) Applicant: Beijing University Of Posts and Telecommunications, Beijing (CN)

(72) Inventors: Qixun Zhang, Beijing (CN); Zhiyong Feng, Beijing (CN); Huan Sun, Beijing (CN); Ping Zhang, Beijing (CN); Zhiqing Wei, Beijing (CN); Sai Huang, Beijing (CN); Yifan Zhang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 310 days.

(21) Appl. No.: 18/026,433

(22) PCT Filed: Dec. 27, 2021

(86) PCT No.: PCT/CN2021/141756
§ 371 (c)(1),
(2) Date: Mar. 15, 2023

(87) PCT Pub. No.: WO2022/143561
PCT Pub. Date: Jul. 7, 2022

(65) Prior Publication Data
US 2024/0039590 A1  Feb. 1, 2024

(30) Foreign Application Priority Data

Dec. 28, 2020  (CN) .......................... 202011577660.8

(51) Int. Cl.
*H04B 7/06*  (2006.01)
*H04B 7/08*  (2006.01)

(52) U.S. Cl.
CPC ............. *H04B 7/0617* (2013.01); *H04B 7/06* (2013.01); *H04B 7/086* (2013.01)

(58) Field of Classification Search
CPC .......... H04B 7/06; H04B 7/0617; H04B 7/08; H04B 7/086
(Continued)

(56) References Cited

U.S. PATENT DOCUMENTS

| | | | | |
|---|---|---|---|---|
| 6,052,079 | A | * | 4/2000 | Kitahara ............... G01S 13/931 342/70 |
| 2015/0057916 | A1 | * | 2/2015 | Ishii ................... G01C 21/3697 701/123 |

(Continued)

FOREIGN PATENT DOCUMENTS

| CN | 105052199 A | 11/2015 |
|---|---|---|
| CN | 110429964 A | 11/2019 |

(Continued)

OTHER PUBLICATIONS

Written Opinion (WO) for PCT/CN2021/141756 mailed Mar. 10, 2022 (9 pages).
(Continued)

*Primary Examiner* — Jean A Gelin
(74) *Attorney, Agent, or Firm* — Jason A. Smith; Shumaker, Loop & Kendrick, LLP

(57) ABSTRACT

A broadband millimeter wave beam tracking method based on vehicle movement trajectory recognition, which relates to the field of wireless communication. First, a rough estimate of the beam angle is obtained according to the position and attitude of two vehicles in a communication scenario at an initial moment, and a state of the vehicle is judged according to the sudden change rate of the transmitting beam angle starting from a next moment: if it is in the sudden change mode, the observation value $\hat{y}_k$ of the received signal is
(Continued)

calculated; if it is in the smooth change mode, the observation value I is calculated; the observation values in different modes are input into an improved particle filter algorithm for fine beam estimation, to obtain optimal values $x_k$ and $u_k$; and the beam optimal values at the current moment are used to re-estimate a pair of the forming vector of the transmitting beam and the forming vector of the receiving beam to adjust the vehicle and the pilot signal at the next moment is transmitted; by continuously adjusting the beam forming vector at each moment, a beam tracking within an error range is obtained. The present application improves the accuracy and reliability of beam tracking in case of sudden angle change.

12 Claims, 3 Drawing Sheets

(58) Field of Classification Search
USPC .......................................................... 370/330
See application file for complete search history.

(56) References Cited

U.S. PATENT DOCUMENTS

| | | | |
|---|---|---|---|
| 2015/0230263 A1 | 8/2015 | Roy et al. | |
| 2015/0307025 A1* | 10/2015 | Hedley | B60Q 1/535 701/36 |
| 2016/0178729 A1* | 6/2016 | Dolgin | G01S 13/48 342/147 |
| 2018/0287687 A1* | 10/2018 | Wu | G01S 3/043 |
| 2019/0079164 A1* | 3/2019 | Lim | G01S 13/931 |
| 2019/0364492 A1* | 11/2019 | Azizi | H04W 4/024 |
| 2020/0128597 A1 | 4/2020 | Shimizu et al. | |
| 2020/0212988 A1* | 7/2020 | Lim | H04B 7/0626 |
| 2020/0257301 A1* | 8/2020 | Weiser | G08G 1/163 |
| 2020/0348408 A1 | 11/2020 | Peng et al. | |
| 2021/0021328 A1* | 1/2021 | Zhao | H04B 7/0617 |
| 2021/0021959 A1* | 1/2021 | MacNeille et al. | H04N 23/57 |
| 2021/0155247 A1* | 5/2021 | Fu | B60W 40/105 |
| 2022/0201430 A1* | 6/2022 | Sheng | G01S 5/04 |
| 2023/0154342 A1* | 5/2023 | Yasini | G01S 5/0294 701/3 |

FOREIGN PATENT DOCUMENTS

| | | |
|---|---|---|
| CN | 110492911 A | 11/2019 |
| CN | 111918238 A | 11/2020 |
| CN | 111988126 A | 11/2020 |
| CN | 112738764 A | 4/2021 |
| KR | 20190100107 A | 8/2019 |

OTHER PUBLICATIONS

International Search Report (ISR) for PCT/CN2021/141756 mailed Mar. 10, 2022 (5 pages).
Cui Zhuangzhuang et al., "Quasi-stationary regions of millimeter-wave channel for vehicular networks based on ray tracing", Chinese Journal or Radio Science, vol. 32, No. 5, Oct. 2017 (8 pages).
He, Jiyong et al., "Channel Measurement and Ray Tracing Technique for an Outdoor Microcell at Millimeter Wave Band", Academic Journal Electronic Publishing House, 2020, 18 (8): 38-46 (9 pages).
Jeongwan Kang et al., "A Millimeter Wave Beam Tracking in Vehicular Scenario via Particle Filter", Proceedings of IC-NIDC 2018 (5 pages).
Wang, S.L. et al., "Millimeter wave line-of-sight MIMO secure communication technology", Chinese Journal of Radio Science, vol. 35, No. 4, Aug. 2020 (12 pgs).

* cited by examiner

BROADBAND MILLIMETER WAVE BEAM TRACKING METHOD BASED ON VEHICLE MOTION TRAJECTORY COGNITION

The present application claims the priority to a Chinese patent application No. 202011577660.8 filed with the China National Intellectual Property Administration on Dec. 28, 2020 and entitled "Broadband Millimeter Wave Beam Tracking Method Based On Vehicle Motion Trajectory Cognition", which is incorporated herein by reference in its entirety.

TECHNICAL FIELD

The embodiments of the present application relate to millimeter wave beam tracking technologies in the field of wireless communication, and in particular, to a broadband millimeter wave beam tracking method based on vehicle movement trajectory recognition.

BACKGROUND

Regarding the difficult problems faced by autopilot internet-of-vehicles broadband sensing information transmission such as insufficient spectrum resources, limited communication link capacity, and poor timeliness, using a millimeter wave broadband transmission method can increase communication link capacity. Compared with traditional low frequency bands below 6 Giga Hertz (GHz), the millimeter wave high frequency band can provide a transmission speed of tens of gigabits, which is one of candidate technologies for internet-of-vehicles broadband sensing information high efficiency transmission. However, the millimeter wave frequency band signal has weak penetrability, the quality of a channel is prone to being affected by a highly dynamic environment and being occluded by an object, reflection, diffusion, and diffraction of radio waves lead to more obvious multipath and attenuation, and deterioration in quality of an inter-vehicle communication link results in increase of the error rate of a receiving end. By using an antenna array and a beam forming technology to generate a directional narrow beam signal, the signal quality and reliability of an inter-vehicle millimeter wave communication link can be improved. However, how to perform beam alignment and tracking of a directional narrow beam signal is a difficult problem faced by a highly dynamic internet-of-vehicles mobile scenario.

Highly dynamic changes in topology of an internet-of-vehicles, rapid generation and disappearance of a transmission path of a wireless signal, and significant non-stationary properties of a channel, are major challenges faced by a technology of millimeter wave beam alignment and tracking in a scenario where vehicles move in a highly dynamic manner. Existing research considers only internet-of-vehicles millimeter wave communication scenarios in a scenario where the position on the roadside base station side is fixed, has yet to consider internet-of-vehicles millimeter wave communication scenarios where both transmitting and receiving ends have high mobility at the same time, and is unable to scientifically characterize an essential relationship between a non-linear rapidly changing beam and a vehicle movement trajectory or solve the problem of rapid millimeter wave narrow beam direction recognition and accurate and precise beam control in an environment where vehicles have a high dynamic.

Regarding existing broadband millimeter wave beam tracking technologies, there is room for improvement in the following two aspects.

First, current beam tracking solutions fail to consider inter-vehicle millimeter wave communication scenarios whether both transmitting and receiving ends have high mobility at the same time, and are unable to solve the problem of reliable millimeter wave communication between vehicles, and cannot scientifically characterize an essential relationship between a non-linear rapidly changing beam and a vehicle movement trajectory.

Second, in an extreme scenario of vehicle turning and lane changing, the effect of vehicle turning movement on the sudden change of inter-vehicle beam angle is not considered and it is difficult to track a beam angle between transmitting and receiving ends.

Therefore, current beam tracking solutions cannot make full use of vehicle behavior recognition to achieve rapid and accurate beam tracking and ensure reliable internet-of-vehicles broadband mobile communication.

SUMMARY

Considering the problem that it is difficult to track the sudden change of inter-vehicle beam angle in the extreme case of vehicle turning and changing lanes when establishing a beam tracking faced by the establishment of the millimeter wave communication link between vehicles in a high-dynamic environment, the present application provides a broadband millimeter wave beam tracking method based on vehicle movement trajectory recognition. The method uses improved particle filter millimeter wave beam tracking with cognitive assistance of vehicle movement characteristics, which reduces the probability of beam tracking failure, improves accuracy and reliability of beam tracking, and achieves reliable internet-of-vehicles broadband mobile communication. The specific steps are as follows.

Step 1, in a vehicle-to-vehicle (V2V) communication system, constructing a simplified dynamic movement scenario of vehicle communication. The scenario includes: two vehicles in communication (i.e., transmitting end vehicle A, and receiving end vehicle B), surrounding vehicles, and surrounding buildings.

The two vehicles in communication are traveling at a corner of a two-dimensional (2D) road with three lanes, the vehicle A and the vehicle B both use a uniform planar millimeter wave phased antenna array module of a single Radio Frequency (RF) chain.

Step 2, for a moment k, calculating a distance $d_{TX,RX}[k]$ between the two vehicles in communication in a horizontal direction.

Initially, k=0; the formula is as follows:

$$d_{TX,RX}[k] = \sqrt{(p_{TX,x}[k] - p_{RX,x}[k])^2 + (p_{TX,y}[k] - p_{RX,y}[k])^2}$$

$(p_{TX,x}[k], p_{TX,y}[k])$ is the position of the transmitting end vehicle A at the moment k; $(p_{RX,x}[k], p_{RX,y}[k])$ is the position of the receiving end vehicle B at the moment k.

Step 3, deriving a rough estimate of a transmitting end beam angle AoD (Angle-of-Departure) and a rough estimate of a receiving end beam angle AoA (Angle-of-Arrival) at the moment k, based on positions of the two vehicles in communication at the moment k, in combination with attitude information of the vehicles.

A binary variable group $\varphi^{azi}[k]=[\varphi^{azi}[k], \theta^{azi}[k]]^T$, $\phi^{azi}[k]$ represents a horizontal component of a beam angle AoD of a transmitting end vehicle A at the moment k, $\theta^{azi}[k]$ represents a horizontal component of a beam angle AoA of a receiving end vehicle B at the moment k;

$$\begin{cases} \hat{\theta}_k^{azi} = \hat{\phi}_k^{azi} \pm \beta_k \\ \hat{\phi}_k^{azi} = \arctan\left(\frac{p_{TX,y}[k-1] - p_{RX,y}[k-1]}{p_{TX,x}[k-1] - p_{RX,x}[k-1]}\right) + \delta_{\phi^{azi}}[k]\Delta t \\ \beta_k = \beta_{k-1} + w[k]\Delta t \end{cases}$$

$\hat{\theta}^{azi}$ is the rough estimate of the beam angle AoA at the moment k; $\hat{\phi}_k^{azi}$ is the rough estimate of the beam angle AoD at the moment k; $\beta_k$ is the steering angle between a transmitting antenna and a receiving antenna when a vehicle turns at the moment k, w[k] is a sudden change rate of the beam angle AoD of the transmitting end vehicle A at the moment k; $\Delta t$ represents a time interval between adjacent moments k and k-I. $\delta_{\phi^{azi}}[k]$ represents a smooth change rate of the beam angle AoD in a horizontal direction;

a binary variable group $\varphi^{ele}[k]=[\phi^{ele}[k], \theta^{ele}[k]]^T$, $\phi^{ele}[k]$ represents the pitch component of the beam angle AoD at the moment k, $\theta^{ele}[k]$ represents the pitch component of the beam angle AoA at the moment k;

$$\begin{cases} |\hat{\theta}_{l,k}^{ele}| = |\hat{\phi}_{l,k}^{ele}| = \arctan\frac{|H_{TX} - H_{RX}|}{d_{TX,RX}[k-1]} + \delta_{\phi^{ele}}[k]\Delta t \\ \hat{\theta}_{l,k}^{ele} = -\hat{\phi}_{l,k}^{ele} \end{cases}$$

$\hat{\theta}_{l,k}^{ele}$ is the rough estimate of the beam angle AoA on a $l^{th}$ path at the moment k; $\hat{\phi}_{l,k}^{ele}$ is the rough estimate of the beam angle AoD on the $l^{th}$ path at the moment k; $|H_{TX}-H_{RX}|$ is a height difference of vehicles, $H_{TX}$ is a height of the transmitting end vehicle A; $H_{RX}$ is a height of the receiving end vehicle B; $\delta_{\phi^{azi}}[k]$ represents a smooth change rate of the beam angle AoD in a pitch direction.

Step 4, at the moment k=0, the transmitting end vehicle A calculating a forming vector $f_0$ of a transmitting beam and a forming vector $w_0$ of a receiving beam, based on the rough estimates of the beam angles AoD and AoA, and transmitting a pilot signal q;
  calculating the beam forming vector $f_0$ by using an estimate $a_t(\overline{\phi}_0^{azi}, \overline{\phi}_0^{ele})$ of a transmitting beam vector.
  calculating the beam forming vector $w_0$ by using an estimate $a_r(\overline{\theta}_0^{azi}, \overline{\theta}_0^{ele})$ of a receiving beam vector.

Step 5, starting from the moment k=1, judging whether the sudden rate rate of the beam angle of the transmitting end vehicle A meets $w^{(n)}[k] \neq 0$, and, if so, moving on to step 6, otherwise, moving on to step 7; the sudden change rate $w^{(n)}[k]$ is derived based on the steering angle $\beta_k$ between a transmitting antenna and a receiving antenna when a vehicle turns at the moment k and a curved lane radius r of the transmitting end vehicle A.

Step 6, a current state of the transmitting end vehicle A is in a steering sudden change mode, calculating an observation value $\hat{y}_k$ of a received signal at the moment k with an equation as follow:

$$\hat{y}_k = \rho\alpha_k w^H(\overline{\theta}^{azi}, \overline{\theta}^{ele}) a_r(\theta_k^{azi}, \theta_k^{ele}) a_t^H(\phi_k^{azi}, \phi_k^{ele}) f(\overline{\phi}^{azi}, \overline{\phi}^{ele}) q \pm \tilde{n}_k;$$

wherein, $\rho\alpha_k$ is a channel gain of a path; $w^H(\overline{\theta}^{azi}, \overline{\theta}^{ele})$ represents a conjugate transpose matrix of a forming vector of a receiving beam; $f(\overline{\phi}^{azi}, \overline{\phi}^{ele})$ represents a forming vector of a transmitting beam; $a_r(\theta_k^{azi}, \theta_k^{ele})$ represents an estimate of the receiving beam vector; $a_t^H(\phi_k^{azi}, \theta_k^{ele})$ represents a conjugate transpose matrix of an estimate of the transmitting beam vector; ñ[k] represents a white Gaussian noise vector during observation.

Step 7, the current state of the transmitting end vehicle A is in a smooth change mode, calculating an observation value $\hat{p}_k$ of the received signal at the moment k with an equation as follows:

$$\hat{p}_k = \rho\alpha_k w_{k-1}^H a_r(\theta_k^{azi}, \theta_k^{ele}) a_t^H(\phi_k^{azi}, \phi_k^{ele}) f_{k-1} q + \tilde{n}_k$$

$w_{k-1}$ is a forming vector of a receiving beam at the moment k−1; $f_{k-1}$ is a forming vector of a transmitting beam at the moment k−1.

Step 8, inputting the observation value Pk or the observation value $y_k$ into an improved particle filter algorithm for fine beam estimation, to obtain optimal values $\tilde{x}_k$ of the beam angles AoD and AoA and an estimation mean square error $u_k$ of a beam angle. Specifically,
  first, for each transmission path, a discrete channel state vector is calculated based on the channel gain and the beam angle, which is defined as:

$$x[k] = [\alpha_{Re}[k], \alpha_{Im}[k], \varphi^{azi}[k], \varphi^{ele}[k], \delta_{\phi^{azi}}[k], \delta_{\phi^{ele}}[k]]^T$$
wherein, $\alpha_{Re}[k]$ represents the real component of the channel gain $\alpha[k]$, and $\alpha_{Im}[k]$ represents the imaginary component of the channel gain $\alpha[k]$;
further, the channel state vector is modified to a state equation in the form of a matrix containing the sudden change rate and noise, which is expressed as:

$$x[k] = \Phi x[k-1] + \Omega w[k] + u[k]$$

$$\Phi = \begin{bmatrix} P & O & O \\ O & E & Q \\ O & O & R \end{bmatrix}, \Omega = \begin{bmatrix} O \\ U \\ O \end{bmatrix}$$

wherein, $$u[k] = \left[\frac{1-\rho^2}{2}, \frac{1-\rho^2}{2}, \sigma_{\phi^{azi}}^2, \sigma_{\theta^{azi}}^2, \sigma_{\phi^{ele}}^2, \sigma_{\theta^{ele}}^2, \sigma_{\phi^{azi}}^2, \sigma_{\theta^{azi}}^2, \sigma_{\phi^{ele}}^2, \sigma_{\theta^{ele}}^2\right]^T$$

represents a white Gaussian noise vector.

P=diag(ρ, ρ) represents a diagonal matrix of channel coefficients, P represents a channel coefficient; E=diag(1, 1, 1, 1) represents a diagonal matrix of beam coefficients; R=diag($m_\phi$, $m_\theta$, $n_\phi$, $n_\theta$) represents a diagonal matrix of correlation coefficients of the beam angles AoD and AoA, $\{m_\phi, m_\theta, n_\phi, n_\theta\} \in (0,1)$; Q=diag($\Delta t, \Delta t, \Delta t, \Delta t$) represents a diagonal matrix of correlation coefficients of iteration time differences; U=diag[$\Delta t, \Delta t, 0, 0$]$^T$ represents a diagonal matrix of correlation coefficients; then, performing weight updating on the particles with the observation value $\hat{p}_k$ with an equation as follows $$\tilde{w}^*(n)[k] = \tilde{w}^{(n)}[k] \mathcal{L}(\hat{p}_k | s^{(n)}[k]).$$

$\tilde{w}^{(n)}[k]$ characterizes an initial weight of particles before updating the particles at the moment k; $s^{(n)}[k] \triangleq \{x^{(n)}[k], w^{(n)}[k]\}$ characterizes a state equation comprising the channel state vector, the smooth change rate of the beam angle and the sudden change rate of the beam angle at the moment k;

performing weight updating on the particles with the observation value $\hat{y}_k$ with an equation as follows:

$$\tilde{w}^{*(n)}[k] = \tilde{w}^{(n)}[k]\mathcal{L}(\hat{y}_k|s^{(n)}[k]);$$

then, performing weight normalization and resampling by using the updated particles:

$$\tilde{w}^{*(n)}[k] = \frac{\tilde{w}^{*(n)}[k]}{\sum_{j=1}^{N_p} \tilde{w}^{*(j)}[k]}$$

$$\{x^{(j)}[k], \tilde{w}^{(j)}[k]\}_{j=1}^{N_p} = \text{Re sampling}\{x^{*(j)}[k], \tilde{w}^{*(j)}[k]\}_{j=1}^{N_p}$$

$N_p$ represents a total number of particles; $x^{(j)}[k]$ represents a channel state vector of a $j^{th}$ particle; $\tilde{w}^{(j)}[k]$ represents a particle weight of the $j^{th}$ particle;

finally, obtaining optimal values of the beam angles AoD and AoA by using the channel state vector and the updated particle weight:

$$\tilde{x}_k = \sum_{j=1}^{N_p} x^{(j)}[k]\tilde{w}^{(j)}[k]$$

$$u_k = \frac{1}{N_p}\sum_{j=1}^{N_p}\left(x^{(n)}[k] - \tilde{x}_k\right)^2$$

Step 9, re-estimating a forming vector $f_k$ of a transmitting beam and a forming vector $w_k$ of a receiving beam by using the beam state optimal value $\tilde{x}_k$ and the estimation mean square error $u_k$ of the beam angle of the moment k, and transmitting the estimate of the forming vector $f_k$ of the transmitting beam to the transmitting end vehicle A for adjustment, so as to transmit a pilot signal q at the moment k+1 based on the adjusted forming vector $f_k$ of the transmitting beam.

Step 10, returning to step 3, continuing to adjust the beam forming vector of each moment, until an error between an adjusted beam forming vector and an actual beam satisfies a set threshold range, so as to complete beam tracking.

The advantages of the embodiments of the present application lie in:

1) The embodiments of the present application provide a broadband millimeter wave beam tracking method based on vehicle movement trajectory recognition. Based on the improved particle filter beam tracking method, it can predict whether the beam angle has a sudden change according to the vehicle position-attitude information (whether the sudden change rate in the state equation is non-zero or not), and different particle weight update strategies are implemented, which can improve the accuracy and reliability of beam tracking in the case of sudden angle changes.

2) The embodiments of the present application provide a broadband millimeter wave beam tracking method based on vehicle movement trajectory recognition. A rough prediction of the beam angle based on the vehicle position-attitude information is proposed, which is used as the initial input value of the particle filter to assist in improving the particle filter algorithm for further fine estimation of the beam angle, which can effectively improve the timeliness and accuracy of beam tracking.

3) The embodiments of the present application provide a broadband millimeter wave beam tracking method based on vehicle movement trajectory recognition. In order to effectively characterize the essential relationship between non-linear fast-changing beams and vehicle movement trajectories, a correlation matrix between vehicle behavior and beam angle change rate can be constructed to effectively assist beam tracking based on vehicle behavior.

BRIEF DESCRIPTION OF THE DRAWINGS

In order to illustrate the technical solutions of the embodiments of the present application and the prior art more clearly, the accompanying drawings required in the embodiments and the prior art is briefly introduced below. Obviously, the accompanying drawings in the following description are only some of the embodiments of the present invention, those skilled in the art can also obtain other drawings based on these accompanying drawings.

DETAILED DESCRIPTION

Figure 1:
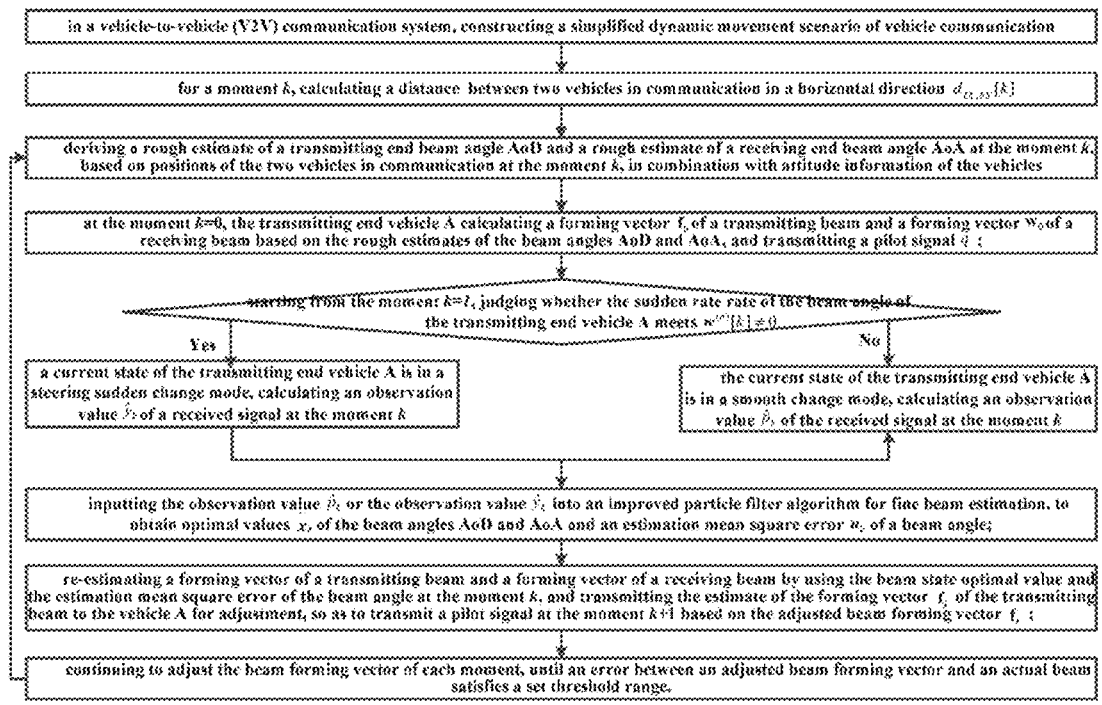
FIG. 1 is a flow chart of a broadband millimeter wave beam tracking method based on vehicle movement trajectory recognition according to an embodiment of the present application.

In order to make the objectives, technical solutions, and advantages of the present application clearer, the present application will be further described in detail below with reference to the accompanying drawings and embodiments. Apparently, the described embodiments are only some of the embodiments of the present application, not all of them. All other embodiments obtained by those of ordinary skill in the art based on the embodiments in the present application fall within the protection scope of the present application.

Embodiments of the present application are millimeter wave beam tracking solutions that ensure the quality of an inter-vehicle communication link in a vehicle-to-vehicle (V2V) communication scenario. Specifically: in a typical internet-of-vehicles scenario of high speed non-linear movement, highly reliable beam tracking is achieved by using a change of beam angle and a vehicle movement trajectory, in combination with an effect of frequent and rapid alternating change of directing and scattering multiple paths on vehicle-to-vehicle (V2V) communication, so as to ensure continuity and high efficiency of the connection of the communication link.

However, existing beam tracking research considers only internet-of-vehicles millimeter wave communication scenarios in a scenario where the roadside base statement side position is fixed, has yet to consider inter-vehicle millimeter wave communication scenario where both transmitting and receiving ends have high mobility at the same time, lacks theory regarding rapid and accurate recognition of vehicle movement properties and narrow wave directivity and beam control method research, and cannot meet requirements of inter-vehicle ultra-broadband low latency information sharing in a future typical autopilot scenario. At the same time, behaviors such as highly dynamic movement of the vehicle, turning of the vehicle, and lane changing of the vehicle will cause a sudden change of a relative azimuth between transmitting and receiving ends of communication, which also increases the difficulty of millimeter wave beam tracking.

Regarding the above-described problems, for the broadband millimeter wave beam tracking problem in a vehicle-to-vehicle (V2V) communication scenario, the embodiments of the present application consider an associative relationship between a change of beam angle and vehicle movement trajectory behavior, and propose an improved particle filter beam tracking method with vehicle movement trajectory recognition assistance. In a broadband millimeter wave communication system, when compared with an existing solution, this solution reduces the probability of beam tracking failure, can greatly improve accuracy and reliability of beam tracking, and achieves reliable internet-of-vehicles broadband mobile communication. Technical problems mainly solved by the embodiments of the present application include the following two points:

1) Considering the effect of a vehicle movement trajectory on the change of millimeter wave beam angle, an essential relationship between a non-linear rapidly changing beam and a vehicle movement trajectory is characterized, so as to assist beam tracking.

2) Considering that in an inter-vehicle millimeter wave communication scenario where both transmitting and receiving ends have high mobility at the same time, it is difficult to track a sudden change of beam angle between vehicles, an improved particle filter beam tracking method with vehicle behavior recognition assistance is proposed, which reduces the probability of beam tracking failure and improves accuracy and reliability of beam tracking.

An embodiment of the present application proposes to use vehicle position-attitude changing information to determine a beam search space subset, model a relationship between vehicle behavior and a beam angle change rate, and track prior information and beam angle non-linear change process based on an improved particle filter algorithm. As shown in FIG. 1, specific steps are as follows.

Step 1, in a vehicle-to-vehicle (V2V) communication system, constructing a simplified dynamic movement scenario of vehicle communication.

Figure 2:
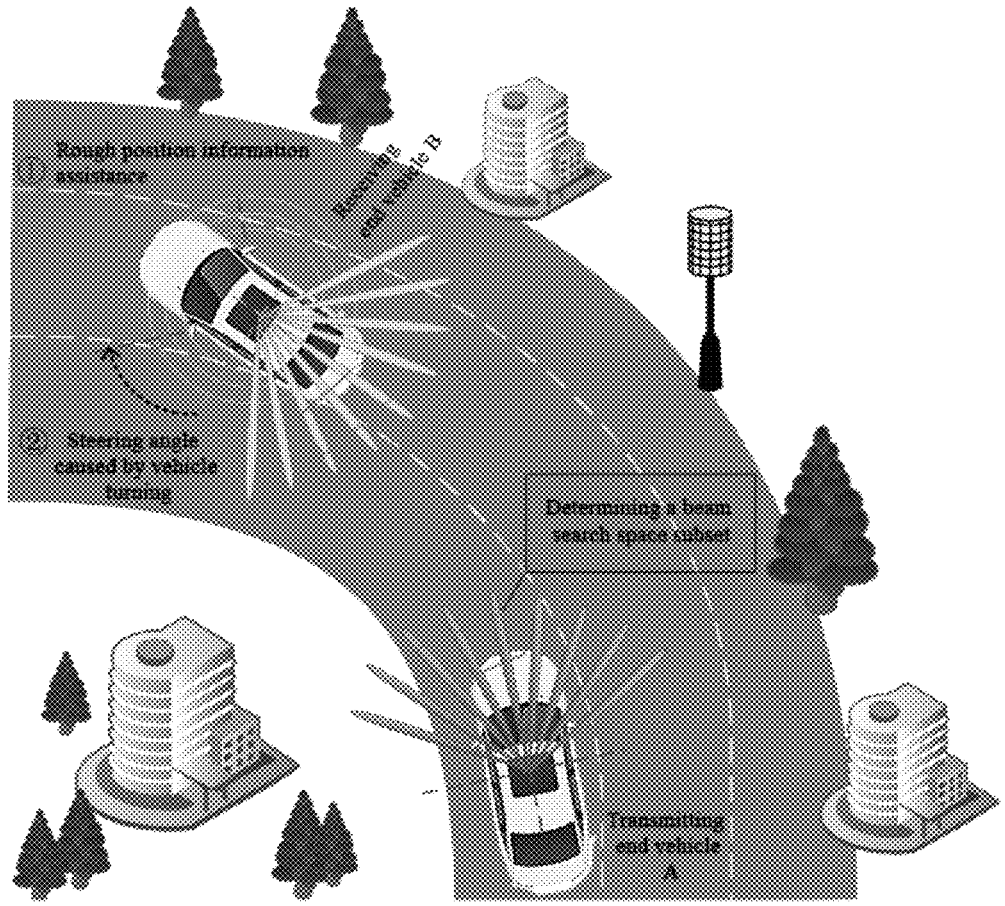
FIG. 2 is a scenario view of a broadband millimeter wave beam tracking method based on vehicle movement trajectory recognition according to an embodiment of the present application.

Potential mobility of a vehicle observed and surrounding objects causes high quality change in a communication link. As shown in FIG. 2, the scenario shown in FIG. 2 includes: two vehicles in communication (i.e., transmitting end vehicle A, and receiving end vehicle B), surrounding vehicles (not shown in FIG. 2), and surrounding buildings. The two vehicles in communication in FIG. 2 are traveling on a curved lane. The 9 ovals on the transmitting end vehicle A represent transmitting beams of 9 different attitudes of the transmitting end vehicle A. The 9 ovals on the receiving end vehicle B represent receiving beams of 9 different attitudes of the receiving end vehicle B. In the embodiment of the present application, the transmitting end vehicle is referred to as the transmitting end for short, and the receiving end vehicle is referred to as the receiving end for short.

As shown in FIG. 2, the two vehicles in communication can be traveling at a corner of a two-dimensional (2D) road with three lanes. In an actual application, the two vehicles in communication can be traveling on a two-dimensional road of another form, for example, a two-dimensional straight two-way four-lane road, which is not specifically limited by the embodiment of the present application. The vehicle A and the vehicle B both use a uniform planar array (UPA) millimeter wave phased antenna array module of a single Radio Frequency (RF) chain; $N_t$ represents the size of antennas of a receiving end array; $N_r$ represents the size of antennas of a transmitting end array.

As shown in FIG. 2, surrounding buildings such as road signs, trees, and surrounding vehicles on a road are important objects in a complicated vehicle environment that cause attenuation and reflection of a received signal. Generally, a Line of Sight (LOS) path is rarely blocked by a static surrounding environment, but is often blocked by surrounding vehicles. If a LOS path is not detected, then a non line of sight (NLOS) reflection path from a vehicle becomes a main path. Due to the loss property of millimeter wave, the strength of the received signal of the reflection path actually measured is very weak and cannot be used as a reliable observation value.

Therefore, environment characteristics of a dynamic movement model considered by the embodiment of the present application meet the requirement that there must be a LOS communication link between two vehicles in communication when they are not blocked by the surrounding vehicles. In other words, if the two vehicles in communication are not blocked by other surrounding vehicles, then there exists a LOS communication link between the two vehicles in communication. If the two vehicles in communication are blocked by other surrounding vehicles, then there does not exist a LOS path, and one can consider re-establishing new two vehicles in communication and establishing a new communication system by means of the original two transmitting and receiving parties and other vehicles.

Step 2, for a moment k, calculating a distance dTxRx[k] between the two vehicles in communication in a horizontal direction.

Initially, k=0; the formula is as follows $$d_{TX,RX}[k] = \sqrt{(p_{TX,x}[k] - p_{RX,x}[k])^2 + (p_{TX,y}[k] - p_{RX,y}[k])^2} \quad (1)$$

$(p_{TX,x}[k], p_{TX,y}[k])$ is the position of the transmitting end vehicle A at the moment k; $(p_{RX,x}[k], p_{RX,y}[k])$ is the position of the receiving end vehicle B at the moment k.

Step 3, deriving a rough estimate of a transmitting end beam angle AoD (Angle-of-Departure) and a rough estimate of a receiving end beam angle AoA (Angle-of-Arrival) at the moment k, based on positions of the two vehicles in communication at the moment k, in combination with attitude information of the vehicles.

When the two transmitting and receiving end vehicles are traveling on a straight lane, antennas at the transmitting and receiving ends maintain a parallel relationship. That is, a transmitting antenna on the transmitting end vehicle and a receiving antenna on the receiving end vehicle maintain a parallel relationship such that $\hat{\theta}_k^{azi} = \hat{\phi}_k^{ele}$. At this moment, the steering angle between the transmitting antenna and the receiving antenna $\beta_k = 0$; when the transmitting end vehicle turns or changing lanes, the steering angle between the transmitting antenna and receiving antenna $\beta_k \neq 0$, and $\beta_k$ is derived by calculation using a sudden change rate. In sum, the horizontal components of rough estimates of beam angles AoD and AoA derived based on vehicle position-attitude information are:

$$\begin{cases} \hat{\theta}_k^{azi} = \hat{\phi}_k^{azi} \pm \beta_k \\ \hat{\phi}_k^{azi} = \arctan\left(\frac{p_{TX,y}[k-1] - p_{RX,y}[k-1]}{p_{TX,x}[k-1] - p_{RX,x}[k-1]}\right) + \delta_{\hat{\phi}^{azi}}[k]\Delta t \\ \beta_k = \beta_{k-1} + w[k]\Delta t \end{cases} \quad (2)$$

A binary variable group $(\phi^{azi}[k]=[\phi^{azi}[k], \theta^{azi}[k]]^T, \phi^{azi}[k]$ represents the horizontal component of a beam angle AoD of the transmitting end vehicle A at the moment k, $\theta^{azi}[k]$ represents the horizontal component of a beam angle AoA of the receiving end vehicle B at the moment k.

$\hat{\theta}_k^{azi}$ is the horizontal component of the rough estimate of the beam angle AoA at the moment k; $\hat{\phi}_k^{azi}$ is the horizontal component of the rough estimate of the beam angle AoD at the moment k; $\beta_k$ is the steering angle between a transmitting antenna and a receiving antenna when a vehicle turns at the moment k, that is, $\beta_k$ is the steering angle between a transmitting antenna of the transmitting end vehicle and a receiving antenna of the receiving end vehicle at the moment k; w[k] is a sudden change rate of the beam angle AoD of the transmitting end vehicle A at the moment k; A t represents a time interval between adjacent moments k and k−1. $\delta_{\phi^{azi}}[k]$ represents a smooth change rate of the beam angle AoD in a horizontal direction at the moment k.

In a pitch direction, the pitch components of the beam angles AoD and AoA are not affected by vehicle steering behavior and depend only on a height difference $|H_{TX}-H_{RX}|$ between the transmitting end vehicle and the receiving end vehicle and a horizontal distance $d_{TX,RX}[k]$ between the transmitting end vehicle and the receiving end vehicle at the moment k. Therefore, the pitch components of the rough estimates of beam angles AoD and AoA obtained based on vehicle position-attitude information are as follows:

$$\begin{cases} |\hat{\theta}_{l,k}^{ele}| = |-\hat{\phi}_{l,k}^{ele}| = \arctan\frac{|H_{TX}-H_{RX}|}{d_{TX,RX}[k-1]} + \delta_{\phi^{ele}}[k]\Delta t \\ \hat{\theta}_{l,k}^{ele} = -\hat{\phi}_{l,k}^{ele} \end{cases} \quad (3)$$

A binary variable group $\phi^{ele}[k]=[\phi^{ele}[k], \theta^{ele}[k]]^T, \phi^{ele}[k]$ represents the pitch component of the beam angle AoD at the moment k, $\theta^{ele}[k]$ represents the pitch component of the beam angle AoA at the moment k; $\hat{\theta}_{l,k}^{ele}$ is the pitch component of the rough estimate of the beam angle AoA on a $l^{th}$ path at the moment k; $\hat{\phi}_k^{ele}$ is the pitch component of the rough estimate of the beam angle AoD on the $l^{th}$ path at the moment k; $H_{TX}$ is a height of the transmitting end vehicle A; $H_{RX}$ is a height of the receiving end vehicle B; $\delta_{\phi^{ele}}[k]$ represents a smooth change rate of the beam angle AoD in a pitch direction.

Step 4, at the moment k=0, the transmitting end vehicle A calculating a forming vector $f_0$ of a transmitting beam and a forming vector $w_0$ of a receiving beam based on the rough estimates of the beam angles AoD and AoA, and transmitting a pilot signal q.

In this embodiment, the forming vector $f_0$ of the transmitting beam is a transmitting beam forming vector $f_0$;

calculating the beam forming vector $f_0$ by using an estimate $a_t(\overline{\phi}_0^{azi}, \overline{\phi}_0^{ele})$ of the transmitting beam vector. That is, calculating the forming vector $f_0$ of the transmitting beam by using an estimate $a_t(\overline{\phi}_0^{azi}, \overline{\phi}_0^{ele})$ of the transmitting beam vector;

calculating the beam forming vector $w_0$ by using an estimate $a_r(\overline{\theta}_0^{azi}, \overline{\theta}_0^{ele})$ of a receiving beam vector. That is, calculating the forming vector $w_0$ of the receiving beam by using an estimate $a_r(\overline{\theta}_0^{azi}, \overline{\theta}_0^{ele})$ of a receiving beam vector. Wherein, in step 2 to step 4, estimation of the forming vector of the transmitting beam and the forming vector of the receiving beam can be realized by the receiving end vehicle. The receiving end vehicle, after determining the forming vector of the transmitting beam, transmits the forming vector of the transmitting beam to the transmitting end vehicle so that the transmitting end vehicle transmits a pilot signal based on the forming vector of the transmitting beam.

Step 5, starting from the moment k=1, judging whether the sudden rate rate of the beam angle of the transmitting end vehicle A meets $w^{(n)}[k]\neq 0$, and, if so, moving on to step 6, otherwise, moving on to step 7.

The sudden change rate $w^{(n)}[k]$ is derived based on the steering angle $\beta_k$ between a transmitting antenna and a receiving antenna when a vehicle turns at the moment k and a curved lane radius r of the transmitting end vehicle A, i.e.:

$$w[k] = \frac{d\beta_k}{dt} = \frac{180° v[k]}{\pi r},$$

wherein, v[k] is the vehicle speed of the transmitting end vehicle at the moment k.

Step 6, a current state of the transmitting end vehicle A is in a steering sudden change mode, calculating an observation value $y_k$ of a received signal at the moment k.

When a vehicle turns, as the angle sudden change rate $w^{(n)}[k]\neq 0$, as the beam angle at an adjacent moment undergoes a sudden change, the rough estimates of beam angles $\overline{\phi}_k=\hat{\phi}_k, \overline{\theta}_k=\hat{\theta}_k$ are substituted into $f_k \leftarrow a_t(\hat{\phi}_k^{azi}, \hat{\phi}_k^{ele}); w_k \leftarrow a_r(\hat{\theta}_k^{azi}, \hat{\theta}_k^{ele})$ to obtain a forming vector $\hat{f}_k$ of a transmitting beam and a forming vector $\hat{w}_k$ of a receiving beam.

Considering the sparsity of a millimeter wave channel, after the receiving end vehicle receives the pilot signal q transmitted by the transmitter (i.e., the transmitting end vehicle), the new observation value $\hat{y}_k$ is as follow $$\hat{y}_k = w^H H_k fq + w^H z_k = \quad (4)$$
$$\rho\alpha_k w^H(\overline{\theta}^{azi}, \overline{\theta}^{ele})a_r(\theta_k^{azi}, \theta_k^{ele})a_t^H(\phi_k^{azi}, \phi_k^{ele})f(\overline{\phi}^{azi}, \overline{\phi}^{ele})q + \tilde{n}_k$$

wherein, $\rho\alpha_k$ is a channel gain of a path, that is, $\rho\alpha_k$ represents the channel gain at the moment k of a communication path established between the transmitting end vehicle and the receiving end vehicle, and q represents the pilot signal.

In order to distinguish the observation values calculated in step 6 and step 7, the embodiment of the present application refers to $\hat{y}_k$ calculated in step six as a first observation value at the moment k, and refers to $\hat{p}_k$ calculated in step seven as a second observation value at the moment k.

$w^H(\overline{\theta}^{azi}, \overline{\theta}^{ele})$ represents a transpose matrix of a forming vector of a receiving beam:

$$w(\overline{\theta}^{azi}, \overline{\theta}^{ele}) = \frac{1}{\sqrt{N_r}}\left[1, \ldots, e^{j\frac{2\pi d}{\lambda_c}(x\cos(\overline{\theta}^{azi})\sin(\overline{\theta}^{azi})+y\sin(\overline{\theta}^{azi})\sin(\overline{\theta}^{ele}))}, e^{j\frac{2\pi d}{\lambda_c}((N_x-1)\cos(\overline{\theta}^{azi})\sin(\overline{\theta}^{ele})+(N_y-1)\sin(\overline{\theta}^{azi})\sin(\overline{\theta}^{ele}))}\right]^T \quad (5)$$

$f(\overline{\phi}^{azi}, \overline{\phi}^{ele})$ represents the forming vector of the transmitting beam:

$$f(\overline{\phi}^{azi}, \overline{\phi}^{ele}) = \frac{1}{\sqrt{N_t}}\left[1, \ldots, e^{j\frac{2\pi d}{\lambda_c}(x\cos(\overline{\phi}^{azi})\sin(\overline{\phi}^{azi})+y\sin(\overline{\phi}^{azi})\sin(\overline{\phi}^{ele}))}, \ldots, e^{j\frac{2\pi d}{\lambda_c}(x(N_x-1)\cos(\overline{\phi}^{azi})\sin(\overline{\phi}^{ele})+(N_y-1)\sin(\overline{\phi}^{azi})\sin(\overline{\phi}^{ele}))}\right]^T \quad (6)$$

$a_r(\theta_k^{azi}, \theta_k^{ele})$ represents an estimate of the receiving beam vector at the moment k; $a_t^H(\phi_k^{azi}, \phi_k^{ele})$ represents a transpose matrix of an estimate of the transmitting beam vector; ñ[k] represents a white Gaussian noise vector at the moment k during observation; $\phi_k^{azi}$ represents the horizontal component of AoD at the moment k; $\phi_k^{ele}$ represents the pitch component of AoD at the moment k; $N_t$ represents the size of a receiving end antenna array, that is, $N_t$ represents the product of the number of rows and the number of columns of the receiving end antenna array; $N_r$ represents the size of a transmitting end antenna array, that is, $N_r$ represents the product of the number of rows and the number of columns of the transmitting end antenna array; j represents the unit of an imaginary number; d represents the distance between two adjacent elements in an antenna array; $\lambda_C$ represents the wave length of a signal; $N_x$ represents the number of rows of an antenna array; $N_y$ represents the number of columns of an antenna array.

$H_k$ represents a channel matrix at the moment k:

$$H_k = \rho \sum_{i=1}^{L_{cs}} \sum_{j=1}^{L_m} \alpha_{ij,k} a_r(\theta_{ij,k}^{azi}, \theta_{ij,k}^{ele}) a_t^H(\phi_{ij,k}^{azi}, \phi_{ij,k}^{ele});$$

wherein, $L_p = L_{cs} * L_m$ represents a total number of propagation paths, wherein, $L_{cs}$ represents the number of clusters, and $L_m$ represents the number of propagation paths in each cluster, $\phi_{ij}$ and $\theta_{ij}$ represent the beam angle-of-departure (AoD) and beam angle-of-arrival (AoA) corresponding to the $j^{th}$ propagation path in the $i^{th}$ cluster.

$$\rho = \sqrt{\frac{N_t N_r}{L_{cs} L_m}}$$

and $\alpha_{ij,k}$ represent a channel gain of a corresponding path, and $(*)^H$ is the conjugate transpose operator.

To simplify expression, the calculation formula of $H_k$ is expressed as formula (7):

$$H_k = A_r(\Theta_k) G_k A_t(\Phi_k)^H \quad (7)$$

wherein, $$G_k = \sqrt{\frac{N_t N_r}{L_{cs} L_m}} \text{diag}(\alpha_{1,k}, \alpha_{2,k}, \ldots, \alpha_{L_m,k}, \ldots, \alpha_{L_p,k}) \quad (8)$$

$$A_t(\Phi_k) = [a_t(\phi_{1,k}), \ldots, a_t(\phi_{L_m,k}), \ldots, a_t(\phi_{L_p,k})] \quad (9)$$

$$A_r(\Theta_k) = [a_r(\theta_{1,k}), \ldots, a_r(\theta_{L_m,k}), \ldots, a_r(\theta_{L_p,k})] \quad (10)$$

As the transmitting and receiving end vehicles have mobility, a matrix of communication channel between the transmitting and receiving end vehicles is time-varying. At the moment k+1, a channel matrix $H_{k+1}$ can be expressed as:

$$H_{k+1} = A_r(\Theta_{k+1}) G_{k+1} A_t(\Phi_{k+1})^H \quad (11)$$

Step 7, the current state of the transmitting end vehicle A is in a smooth change mode, calculating an observation value Pk of the received signal at the moment k with an equation as follows:

$$\hat{p}_k = \rho \alpha_k w_{k-1}^H a_r(\theta_k^{azi}, \theta_k^{ele}) a_t^H(\phi_k^{azi}, \phi_k^{ele}) f_{k-1} q + \tilde{n}_k \quad (12)$$

wherein, $\rho \alpha_k$ represents a channel gain of a communication path established between the transmitting end vehicle and the receiving end vehicle at the moment k, $w_{k-1}$ is a forming vector of a receiving beam at the moment k−1, $w_{k-1}^H$ represents a conjugate transpose matrix of a forming vector of the receiving beam at the moment; $a_t^H(\phi_k^{azi}, \phi_k^{ele})$ represents a conjugate transpose matrix of an estimate of a transmitting beam vector; $\phi_k^{azi}$ represents the horizontal component of AoD at the moment k; $\phi_k^{azi}$ represents the pitch component of AoD at the moment k; $f_{k-1}$ is a is a forming vector of a transmitting beam at the moment k−1; q represents a pilot signal; $\tilde{n}_k$ represents a white Gaussian noise vector at the moment k.

Step 8, inputting the observation value $p_k$ or the observation value $\hat{y}_k$ into an improved particle filter algorithm for fine beam estimation, to obtain optimal values $\tilde{x}_k$ of the beam angles AoD and AoA and an estimation mean square error $u_k$ of a beam angle.

Wherein, if the transmitting end vehicle is in a steering sudden change mode, then step eight determines $\tilde{x}_k$ and $u_k$ based on $\hat{y}_k$; if the transmitting end vehicle is in a smooth change mode, then step eight determines $\tilde{x}_k$ and $u_k$ based on $\hat{p}_k$.

Figure 3:
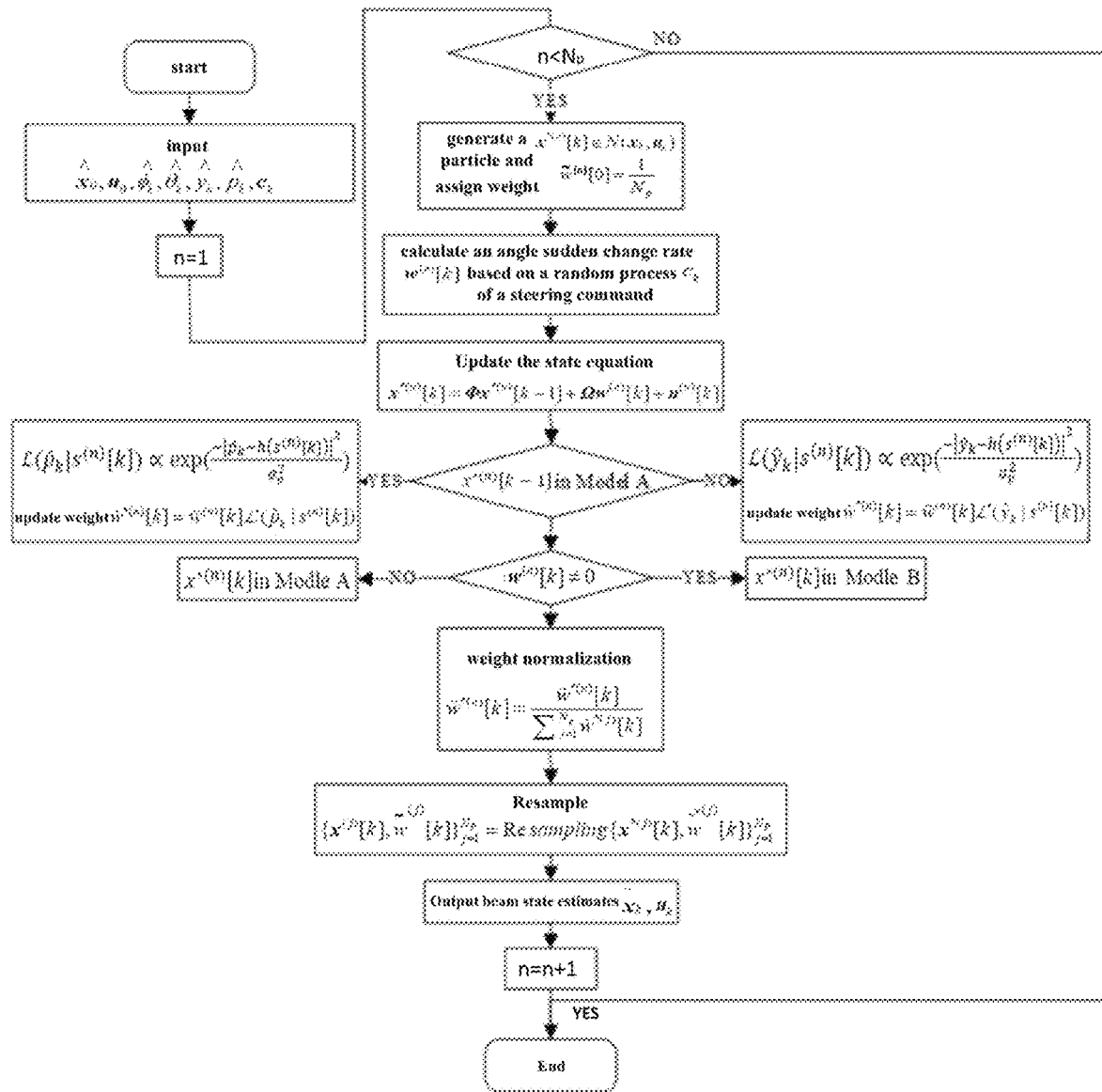
FIG. 3 is the flow chart of an improved particle filter algorithm used in the embodiment of the present application.

As shown in FIG. 3, first, initial values of various variables are inputted:

$\hat{x}_0$, $u_0$, $\hat{\phi}_k$, $\hat{\theta}_k$, $\hat{y}_k$, $\hat{p}_k$, $\hat{c}_k$; starting from n=1 for particles, when n<$N_p$, that is, starting from n=1 for particles, when n<$N_p$, particles $x^{*(n)}[k] \in N(\tilde{x}_k, u_k)$ are generated, and a weight is assigned $$\tilde{w}^{(n)}[0] = \frac{1}{N_p},$$

$N_p$ being a total number of particles; then, an angle sudden change rate $w^{(n)}[k]$ is calculated based on a random process $c_k$ of a steering command and a state equation is updated: $x^{*(n)}[k] = \Phi x^{*(n)}[k-1] + \Omega w^{(n)}[k] + u^{(n)}[k]$, and it is judged whether the particle $x^{*(n)}[k-1]$ generated at the moment k−1 is in Model A, wherein, Model A represents a smooth change mode, and Model B represents a steering sudden change mode. If it is in Model A, then $$\mathcal{L}(\hat{p}_k|s^{(n)}[k]) \propto \exp\left(\frac{-|\hat{p}_k - h(s^{(n)}[k])|^2}{\sigma_v^2}\right)$$

is executed and the weight is updated, $\tilde{w}^{*(n)}[k] = \tilde{w}^{(n)}[k] \mathcal{L}(\hat{p}_k|s^{(n)}[k])$; if it is not in Model A, then $$\mathcal{L}(\hat{y}_k|s^{(n)}[k]) \propto \exp\left(\frac{-|\hat{y}_k - h(s^{(n)}[k])|^2}{\sigma_v^2}\right)$$

is executed, and the weight is updated, $\tilde{w}^{*(n)}[k] = \tilde{w}^{(n)}[k] \mathcal{L}(\hat{y}_k|s^{(n)}[k])$. Wherein, h is a function symbol, and $\sigma_v$ is $\sigma$, representing a variance. After updating the weight, different particle weight updating strategies are executed based on whether an angle change $w^{(n)}[k]$ is 0. If the condition that $w^{(n)}[k] \neq 0$ is met, it is determined that the current state is in a steering sudden change mode, i.e., $x^{*(n)}[k]$ in Model B; otherwise, it is determined that the current state is in a smooth change mode, i.e., $x^{*(n)}[k]$ in Model A. After updating the particle weight in different modes, normalization and resampling operations are performed. Finally, a beam state optimal value $z_k$ and an estimation mean square error $u_k$ of a beam angle are outputted. Then, a next particle is selected and the above-described process is repeated.

Specifically:
first, a gain and a beam angle variable in the channel model are extracted to represent a channel state, and for each propagation path, a discrete channel state vector is defined as:

$$x[k] = [\alpha_{Re}[k], \alpha_{Im}[k], \varphi^{azi}[k], \varphi^{ele}[k], \delta_{\dot{\varphi}^{azi}}[, \delta_{\dot{\varphi}^{ele}}[k]^T \quad (13)$$

wherein, $\alpha_{Re}[k]$ represents a real component of the channel gain $\alpha[k]$ and $\alpha_{Im}[k]$ represents an imaginary component of the channel gain $\alpha[k]$; the binary variable group $\delta_{\dot{\varphi}^{azi}}[k] = \delta_{\dot{\varphi}^{azi}}[k], \delta_{\dot{\varphi}^{azi}}[k]]^T$ represents the smooth change rates of AoD and AoA in a horizontal direction; the binary variable group
$\delta_{\dot{\varphi}^{ele}}[k] = \delta_{\dot{\varphi}^{ele}}[k], \delta_{\dot{\varphi}^{ele}}[k]]^T$ represents the smooth change rates of AoD and AoA in a pitch direction.

Assume that the smooth change rates of AoD and AoA in a horizontal direction and in a pitch direction follow a Gaussian random process, wherein, $\{m_\phi, m_\theta, n_\phi, n_\theta\} \in (0,1)$ represents correlation coefficients, $[\sigma_{\dot{\varphi}^{azi}}^2, \sigma_{\dot{\theta}^{azi}}^2, \sigma_{\dot{\varphi}^{ele}}^2, \sigma_{\dot{\theta}^{ele}}^2]^T \sim N(\mathbf{0}, \sigma_{\dot{\varphi}}^2)$ represents a white Gaussian noise vector.

$$\begin{cases} \delta_{\dot{\varphi}^{azi}}[k] = m_\phi \delta_{\dot{\varphi}^{azi}}[k-1] + \sigma_{\dot{\varphi}^{azi}}^2 \\ \delta_{\dot{\theta}^{azi}}[k] = m_\theta \delta_{\dot{\theta}^{azi}}[k-1] + \sigma_{\dot{\theta}^{azi}}^2 \\ \delta_{\dot{\varphi}^{ele}}[k] = n_\phi \delta_{\dot{\varphi}^{ele}}[k-1] + \sigma_{\dot{\varphi}^{ele}}^2 \\ \delta_{\dot{\theta}^{ele}}[k] = n_\theta \delta_{\dot{\theta}^{ele}}[k-1] + \sigma_{\dot{\theta}^{ele}}^2 \end{cases} \quad (14)$$

In addition, in the event of turning, vehicle steering behavior will cause a sudden change of beam angle. Assuming that at the moment k, the vehicle speed of the transmitting end vehicle is v[k], the turning radius of the road on which the transmitting end vehicle is traveling is r, and the beam angle change caused by the transmitting end vehicle's steering behavior is expressed as $\beta_k$, the beam angle sudden change rate w[k] can be expressed as:

$$w[k] = \frac{d\beta_k}{dt} = \frac{180° v[k]}{\pi r}.$$

Thus, the channel state vector is modified to a state equation in the form of a matrix containing the sudden change rate and noise, which is expressed as:

$$x[k] = \Phi x[k-1] + \Omega w[k] + u[k] \quad (15)$$

$$\Phi = \begin{bmatrix} P & O & O \\ O & E & Q \\ O & O & R \end{bmatrix}, \Omega = \begin{bmatrix} O \\ U \\ O \end{bmatrix} \quad (16)$$

wherein, $$u[k] = \left[\frac{1-\rho^2}{2}, \frac{1-\rho^2}{2}, \sigma_{\dot{\varphi}^{azi}}^2, \sigma_{\dot{\theta}^{azi}}^2, \sigma_{\dot{\varphi}^{ele}}^2, \sigma_{\dot{\theta}^{ele}}^2, \sigma_{\dot{\varphi}^{azi}}^2, \sigma_{\dot{\theta}^{azi}}^2, \sigma_{\dot{\varphi}^{ele}}^2, \sigma_{\dot{\theta}^{ele}}^2\right]^T$$

represents a white Gaussian noise vector at the moment k.

$P = \text{diag}(\rho, \rho)$ represents a diagonal matrix of channel coefficients of a communication channel between the transmitting end vehicle and the receiving end vehicle, $\rho$ represents a channel coefficient; $E = \text{diag}(1, 1, 1, 1)$ represents a diagonal matrix of beam coefficients of AoD and AoA; $R = \text{diag}(m_\phi, m_\theta, n_\phi, n_\theta)$ represents a diagonal matrix of correlation coefficients of the beam angles AoD and AoA, $\{m_\phi, m_\theta, n_\phi, n_\theta\} \in (0,1)$; $Q = \text{diag}(\Delta t, \Delta t, \Delta t, \Delta t)$ represents a diagonal matrix of correlation coefficients of iteration time differences; $U = \text{diag}[\Delta t, \Delta t, 0, 0]^T$ represents a diagonal matrix of correlation coefficients;

then, performing weight updating on the particle with the observation value $\hat{p}_k$ as follows:

$$\tilde{w}^{*(n)}[k] = \tilde{w}^{(n)}[k] \mathcal{L}(\hat{p}_k|s^{(n)}[k]) \quad (17)$$

$\tilde{w}^{(n)}[k]$ characterizes an initial weight of particles before updating the particles at the moment k.

The process of evolving of the beam angles AoD and AoA can be modeled as the process of evolving of a channel state vector based on the channel state vector and the proposed state equation. And, $s^{(n)}[k] \triangleq \{x^{(n)}[k], w^{(n)}[k]\}$ characterizes a state equation comprising the channel state vector of a communication channel between the transmitting end vehicle and the receiving end vehicle, a smooth change rate of beam angle AoD, and a sudden change rate of AoD at the moment k, and thus an observation equation based on a received signal can be expressed as:

$$y[k] = h(s[k]; \bar{\varphi}) + \tilde{n}[k] \quad (18)$$

Weight updating is performed on the particles with the observation value $\hat{y}_k$ as follows:

$$\tilde{w}^{*(n)}[k] = \tilde{w}^{(n)}[k] \mathcal{L}(\hat{y}_k|s^{(n)}[k]) \quad (19)$$

Then, formula (20) is used to perform weight normalization on the updated particles, and formula (21) is used to resample the normalized particle and its weight:

$$\tilde{w}^{*(n)}[k] = \frac{\tilde{w}^{*(n)}[k]}{\sum_{j=1}^{N_P} \tilde{w}^{*(j)}[k]} \quad (20)$$

$$\{x^{(j)}[k], \tilde{w}^{(j)}[k]\}_{j=1}^{N_P} = \text{Re sampling } \{x^{*(j)}[k], \tilde{w}^{*(j)}[k]\}_{j=1}^{N_P} \quad (21)$$

$N_p$ represents a total number of particles; $x^{(j)}[k]$ represents a channel state vector of a $j^{th}$ particle; $\tilde{w}^{(j)}[k]$ represents a particle weight of the $j^{th}$ particle;

finally, obtaining optimal values of the beam angles AoD and AoA by using the channel state vector and the updated particle weight:

$$\tilde{x}_k = \sum_{j=1}^{N_P} x^{(j)}[k]\tilde{w}^{(j)}[k] \qquad (22)$$

$$u_k = \frac{1}{N_P}\sum_{j=1}^{N_P}\left(x^{(n)}[k] - \tilde{x}_k\right)^2$$

Step 9, re-estimating the forming vector $f_k$ of the transmitting beam and the forming vector $w_k$ of the receiving beam by using the beam state optimal value Xk and the estimation mean square error $u_k$ of the beam angle at the moment k, and transmitting the estimate of the forming vector $f_k$ of the transmitting beam to the transmitting end vehicle A for adjustment, so as to transmit a pilot signal q at the moment k+1 based on the adjusted forming vector $f_k$ of the transmitting beam. Step 5 to step nine can be executed by the receiving end vehicle.

Step 10, returning to step 3, continuing to adjust the beam forming vector of each moment, until an error between an adjusted beam forming vector and an actual transmitting beam satisfies a set threshold range, so as to complete beam tracking. That is, starting from the moment k=1, for each moment, step five to step nine are executed to continue to adjust a beam forming vector, until an error between an adjusted beam forming vector and an actual transmitting beam satisfies a set threshold range, so as to complete beam tracking. At the same time, if an error between an adjusted beam forming vector and an actual transmitting vector does not satisfy a set threshold range, then the method can return to step 3 to perform beam tracking again.

The embodiment of the present application proposes an improved particle filter algorithm based on the beam state equation x[k] and the observation equation y[k], uses rough estimates of beam angles realized based on vehicle position-attitude as input values, and performs fine estimation of beam angles with non-linear change by updating weights of particles. The angle sudden change rate $w^{(n)}[k]$ is calculated based on a random process $c_k$ of turning commands. The improved particle filter algorithm will execute different particle weight updating strategies based on whether an angle change undergoes a sudden change, i.e., whether $w^{(n)}[k]$ is 0. If the condition $w^{(n)}[k] \neq 0$ is met, it is determined that the current state is in a steering sudden change mode; otherwise, it is determined that the current state is in a smooth change mode. When it is in mode A, the angle sudden change rate $w^{(n)}[k]=0$, the change of beam angle between adjacent moments is relatively small. Finally, estimates of the different parameters containing beam angles in the beam state equation are obtained.

Compared with the prior art, first, the embodiment of the present application, wherein, an associative matrix between vehicle behavior and a beam angle change rate is constructed based on a beam state equation, can effectively characterize an essential relationship between a non-linear rapidly changing beam and a vehicle movement trajectory. Second, as the prior art fails to consider extreme scenarios where a vehicle turns or change lanes, because vehicle turning movement affects inter-vehicle beam angle sudden change, in order to solve the problem that inter-vehicle beam angle sudden change is difficult to track in an inter-vehicle millimeter wave communication scenario where both transmitting and receiving ends have high mobility at the same time, the present application proposes an improved particle filter beam tracking method with vehicle behavior recognition assistance, which reduces the probability of beam tracking failure, improves accuracy and reliability of beam tracking, and achieves reliable internet-of-vehicles broadband mobile communication.

Figure 4:
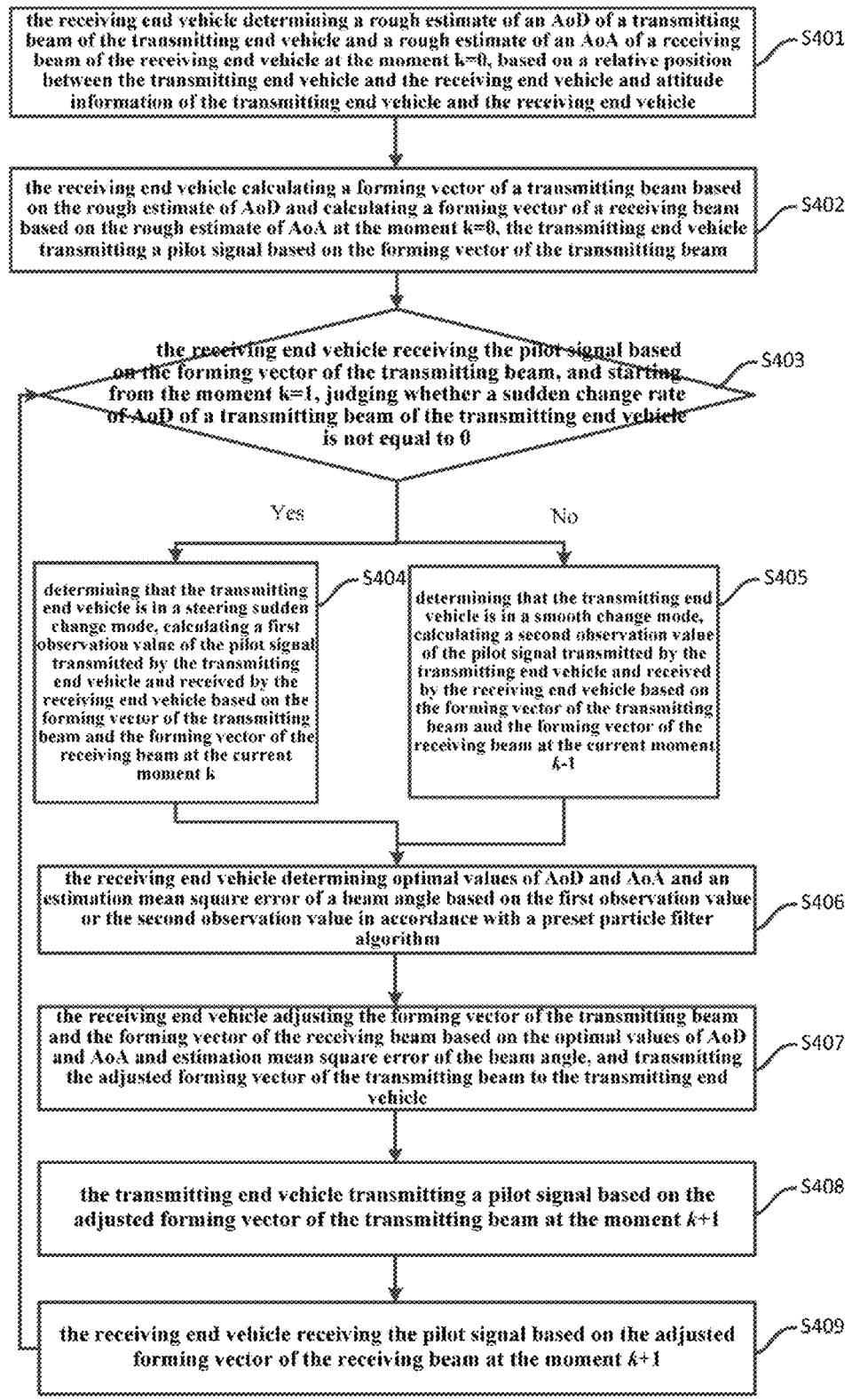
FIG. 4 is a flow chart of a broadband millimeter wave beam tracking method based on vehicle movement trajectory recognition provided by an embodiment of the present application.

Based on the same inventive idea, in order to address the problem that a change in relative position between two vehicles in communication results in a transmitting and receiving beam angle change, an embodiment of the present application provides a broadband millimeter wave beam tracking method based on vehicle movement trajectory recognition which is applied to a vehicle-to-vehicle (V2V) communication system, wherein, the vehicle-to-vehicle (V2V) communication system comprises a transmitting end vehicle and a receiving end vehicle capable of communicating with each other. As shown in FIG. 4, the method includes the following steps.

S401, the receiving end vehicle determining a rough estimate of an AoD of a transmitting beam of the transmitting end vehicle and a rough estimate of an AoA of a receiving beam of the receiving end vehicle at the moment k=0, based on a relative position between the transmitting end vehicle and the receiving end vehicle and attitude information of the transmitting end vehicle and the receiving end vehicle.

Wherein, attitude information includes a steering angle between a transmitting antenna of the transmitting end vehicle and a receiving antenna of the receiving end vehicle, i.e., the above-described $\beta_k$. For the specific implementation of S401, please refer to the above-described step 3.

S402, the receiving end vehicle calculating a forming vector of a transmitting beam based on the rough estimate of AoD and calculating a forming vector of a receiving beam based on the rough estimate of AoA at the moment k=0, the transmitting end vehicle transmitting a pilot signal based on the forming vector of the transmitting beam. In this embodiment, the receiving end vehicle can transmit the calculated forming vector of the transmitting beam to the transmitting end vehicle so that the transmitting end vehicle transmits a pilot signal based on the forming vector of the transmitting beam. For the specific implementation of S402, please refer to the above-described step 4.

S403, the receiving end vehicle receiving the pilot signal based on the forming vector of the receiving beam, and starting from the moment k=1, judging whether a sudden change rate of AoD of a transmitting beam of the transmitting end vehicle is not equal to 0, and if so, then executing S404, or otherwise, then executing S405. For the specific implementation of S403, please refer to the above-described step 5.

S404, determining that the transmitting end vehicle is in a steering sudden change mode, calculating a first observation value of the pilot signal transmitted by the transmitting end vehicle and received by the receiving end vehicle based on the forming vector of the transmitting beam and the forming vector of the receiving beam at the current moment k.

Wherein, the first observation value is the above-described $\hat{y}_k$. For the specific implementation of S404, please refer to the above-described step 6.

S405, determining that the transmitting end vehicle is in a smooth change mode, calculating a second observation value of the pilot signal transmitted by the transmitting end vehicle and received by the receiving end vehicle based on the forming vector of the transmitting beam and the forming vector of the receiving beam at the current moment k−1.

Wherein, the second observation value is the above-described $\hat{p}_k$. For the specific implementation of S405, please refer to the above-described step 7.

S406, the receiving end vehicle determining optimal values of AoD and AoA and an estimation mean square error of a beam angle based on the first observation value or the second observation value in accordance with a preset particle filter algorithm.

In the embodiment of the present application, if the transmitting end vehicle is in a steering sudden change mode, then S406 determines optimal values of AoD and AoA and an estimation mean square error of a beam angle based on the first observation value; if the transmitting end vehicle is in a smooth change mode, then S406 determines optimal values of AoD and AoA and the estimation mean square error of the beam angle based on the second observation value. For the specific implementation of S406, please refer to the above-described step 8.

S407, the receiving end vehicle adjusting the forming vector of the transmitting beam and the forming vector of the receiving beam based on the optimal values of AoD and AoA and the estimation mean square error of the beam angle, and transmitting the adjusted forming vector of the transmitting beam to the transmitting end vehicle. For the specific implementation of S407, please refer to the above-described step 9.

S408, the transmitting end vehicle transmitting a pilot signal based on the adjusted forming vector of the transmitting beam at the moment k+1. For the specific implementation of S408, please refer to the above-described step 9.

S409, the receiving end vehicle receiving the pilot signal based on the adjusted forming vector of the receiving beam at the moment k+1, and returning to S403, until an error between the adjusted forming vector of the transmitting beam and an actual transmitting beam satisfies a preset threshold range. For the specific implementation of S409, please refer to the above-described step 10.

In the embodiment of the present application, the receiving end vehicle realizes rough estimation of the forming vector of the transmitting beam and the forming vector of the receiving beam based on the relative position and attitude information of the two vehicles in communication, and the preset particle filter algorithm performs further fine estimation of the forming vector of the transmitting beam and the forming vector of the receiving beam obtained by rough estimation. Compared with using only rough estimation or using only fine estimation, the timeliness and accuracy of beam tracking can be effectively improved by means of the two-step estimation.

In an embodiment of the present application, the above-described S406 can include the following steps. For the specific implementation of S406, please refer to the above-described step 8.

Step 1, starting from n=1, when n≤$N_p$, generating a particle $x^{*(n)}[k] \in N(\tilde{x}_k, u_k)$ based on a rough estimate of AoD and a rough estimate of AoA, and assigning an initial weight $$\tilde{w}^{(n)}[0] = \frac{1}{N_p}$$

to the current particle.

Step 2, updating the current particle based on a sudden change rate of AoD of a transmitting beam of the transmitting end vehicle, the updated particle being: $x^{*(n)}[k] = \Phi x^{*(n)}[k-1] + \Omega w^{(n)}[k] + u^{(n)}[k]$.

Step 3, when it is determined that the transmitting vehicle is in a steering sudden change mode, updating the weight of the current particle based on a first observation value. For the calculation formula of the weight, please refer to the above-described formula (17).

Step 4, when it is determined that the transmitting vehicle is in a smooth change mode, updating the weight of the current particle based on a second observation value.

For the calculation formula of the weight, please refer to the above-described formula (19).

Step 5, setting n=n+1, generating a next particle, and returning to the step of assigning an initial weight to the current particle in step 1.

Step 6, normalizing an updated weight of each of the particles, and resampling the updated particles and normalized weights. For the calculation formula of normalization, please refer to the above-described formula (20), and for the calculation formula of resampling, please refer to the above-described formula (21).

Step 7, determining optimal values of AoD and AoA and an estimation mean square error of a beam angle based on resampling results. For the calculation formula of step 7, please refer to the above-described formula (22).

In an embodiment of the present application, the driving mode of the transmitting end vehicle is judged based on the sudden change rate of the AoD of the transmitting end vehicle, and thus different particle weight updating strategies are executed, which can adapt to different change situations of the AoD of the transmitting end vehicle and effectively improve the accuracy and reliability of beam tracking in actual applications.

In an embodiment of the present application, the transmitting end vehicle and the receiving end vehicle are traveling at a corner of a two-dimensional road, and the transmitting end vehicle and the receiving end vehicle both use a uniform planar millimeter wave phased antenna array module of a RF chain.

In an embodiment of the present application, the sudden change rate $w^{(n)}[k]$ of AoD at the moment k is derived based on the steering angle $\beta_k$ between a transmitting antenna of the transmitting end vehicle and a receiving antenna of the receiving end vehicle at the moment k, and a curved lane radius r of a lane on which the transmitting end vehicle is traveling. For the specific mode of calculation, please refer to the description of the above-described step 5.

In an embodiment of the present application, an essential relationship between a non-linear rapidly changing beam and a vehicle movement trajectory can be effectively characterized by constructing a relationship between the sudden change rate of AoD and the steering angle between a transmitting angle of the transmitting end vehicle and a receiving antenna of the receiving end vehicle, and thus the steering situation of the transmitting end vehicle can be accurately estimated based on the steering angle, which improves accuracy of beam tracking.

Based on the same inventive idea, corresponding to the above-described method embodiment, an embodiment of the present application further provides a vehicle comprising: at least one processor; and, a memory connected in communication with the at least one processor; wherein, the memory stores instructions executable by the at least one processor, the instructions when being executed by the at least one processor, cause the at least one processor to execute the steps executed by the transmitting end vehicle or the receiving end vehicle in the above-described method embodiments.

The communication bus mentioned in the aforementioned vehicle may be a Peripheral Component Interconnect (PCI) bus or an Extended Industry Standard Architecture (EISA) bus or the like. The communication bus can be divided into an address bus, a data bus, a control bus, and the like. The communication interface is used for communication between the above-mentioned vehicles and other devices. The memory may include a random access memory (RAM), and may also include a non-volatile memory (NVM), such as at least one disk memory. Optionally, the memory may also be at least one storage device located far away from the aforementioned processor.

The above-mentioned processor can be a general-purpose processor, including a central processing unit (CPU), a network processor (NP), and the like; it can also be a digital signal processor (DSP), an application specific integrated circuit (ASIC), Field-Programmable Gate Array (FPGA) or other programmable logic devices, discrete gate or transistor logic devices, discrete hardware components.

In yet another embodiment provided by the present invention, it is provided a computer-readable storage medium storing computer programs, the computer programs when being executed by a processor, cause the processor to implement any of steps of the above-mentioned broadband millimeter wave beam tracking method based on vehicle movement trajectory. In yet another embodiment of the present invention, it is also provided a computer program product containing instructions, the instructions when being executed on a computer, cause the computer to implement any of the broadband millimeter wave beam tracking method based on vehicle movement trajectory recognition in the above embodiments.

In the above embodiments, all or part of them may be implemented by software, hardware, firmware or any combination thereof. When implemented using software, it may be implemented in whole or in part in the form of a computer program product. The computer program product includes one or more computer instructions. When the computer program instructions are loaded and executed on the computer, the processes or functions according to the embodiments of the present invention will be generated in whole or partially. The computer can be a general purpose computer, a special purpose computer, a computer network, or other programmable devices. The computer instructions may be stored in a computer-readable storage medium or transmitted from one computer-readable storage medium to another computer-readable storage medium.

For example, the computer instructions may be transmitted from a website, computer, server or data center to another website site, computer, server, or data center by wired (e.g. coaxial cable, fiber optic, digital subscriber line (DSL)) or wireless (e.g. infrared, wireless, microwave, and the like) means. The computer-readable storage medium may be any available medium that can be accessed by a computer, or a data storage device such as a server or a data center integrated with one or more available media. The available medium may be a magnetic medium (for example, a floppy disk, a hard disk, or a magnetic tape), an optical medium (for example, DVD), or a semiconductor medium (for example, a Solid State Disk (SSD)), etc.

It should be noted that in this article, relational terms such as first and second are only used to distinguish one entity or operation from another entity or operation, and do not necessarily require or imply that there is any such actual relationship or order between these entities or operations. Furthermore, the term "include", "comprise" or any other variation thereof is intended to cover a non-exclusive inclusion such that a process, method, article, or apparatus comprising a set of elements includes not only those elements, but also includes other elements not expressly listed or also include elements inherent in such a process, method, article, or device. Without further limitations, an element defined by the phrase "comprise a . . . " does not exclude the presence of additional identical elements in the process, method, article or apparatus comprising said element.

Each embodiment in the present specification is described in a related manner, the same and similar parts of each embodiment can be referred to each other, and each embodiment focuses on the differences from other embodiments.

The above descriptions are only preferred embodiments of the application, and are not intended to limit the present application. Any modifications, equivalent replacements, improvements made within the spirit and principles of the application shall fall within the protection of the application.

What is claimed is:

1. A broadband millimeter wave beam tracking method based on vehicle movement trajectory recognition, wherein specific steps are as follow:

step 1, in a vehicle-to-vehicle (V2V) communication system, constructing a simplified dynamic movement scenario of vehicle communication;

step 2, for a moment k, calculating a distance $d_{TX,RX}[k]$ between two vehicles in communication in a horizontal direction; initially, k=0;

step 3, deriving a rough estimate of a transmitting end beam angle AoD (Angle-of-Departure) and a rough estimate of a receiving end beam angle AoA (Angle-of-Arrival) at the moment k, based on positions of the two vehicles in communication at the moment k, in combination with attitude information of the vehicles;

a binary variable group $\varphi^{azi}[k]=[\phi^{azi}[k], \theta^{azi}[k]]^T$, $\phi^{azi}[k]$ represents a horizontal component of a beam angle AoD of a transmitting end vehicle A at the moment k, $\theta^{azi}[k]$ represents a horizontal component of a beam angle AoA of a receiving end vehicle B at the moment k;

$$\begin{cases} \hat{\theta}_k^{azi} = \hat{\phi}_k^{azi} \pm \beta_k \\ \hat{\phi}_k^{azi} = \arctan\left(\frac{p_{TX,y}[k-1]-p_{RX,y}[k-1]}{p_{TX,x}[k-1]-p_{RX,x}[k-1]}\right) + \delta_{\phi}^{azi}[k]\Delta t \\ \beta_k = \beta_{k-1} + w[k]\Delta t \end{cases}$$

$\hat{\theta}_k^{azi}$ is a rough estimate of the beam angle AoA at the moment k; $\hat{\phi}_k^{azi}$ is a rough estimate of the beam angle AoD at the moment k; $\beta_k$ is a steering angle between a transmitting antenna and a receiving antenna when a vehicle turns at the moment k; $(p_{TX,x}[k], p_{TX,y}[k])$ is a position of the transmitting end vehicle A at the moment k; $(p_{RX,x}[k], p_{RX,y}[k])$ is a position of the receiving end vehicle B at the moment k; w[k] is a sudden change rate of the beam angle AoD of the transmitting end vehicle A at the moment k; $\Delta t$ represents a time interval between adjacent moments k and k−1; $\delta_{\phi}^{azi}[k]$ represents a smooth change rate of the beam angle AoD in a horizontal direction;

a binary variable group $\varphi^{ele}[k]=[\phi^{ele}[k], \theta^{ele}[k]]^T$, $\phi^{ele}[k]$ represents a pitch component of the beam angle AoD at the moment k, $\theta^{ele}[k]$ represents a pitch component of the beam angle AoA at the moment k;

$$\begin{cases} |\hat{\theta}_{i,k}^{ele}| = |\hat{\phi}_{i,k}^{ele}| = \arctan\frac{|H_{TX}-H_{RX}|}{d_{TX,RX}[k-1]} + \delta_{\hat{\phi}^{ele}}[k]\Delta t \\ \hat{\theta}_{i,k}^{ele} = -\hat{\phi}_{i,k}^{ele} \end{cases}$$

$\hat{\theta}_{l,k}^{ele}$ is a rough estimate of the beam angle AoA on a $l^{th}$ path at the moment k; $\hat{\phi}_{l,k}^{ele}$ is a rough estimate of the beam angle AoD on the $l^{th}$ path at the moment k; $|H_{TX}-H_{RX}|$ is a height difference of vehicles, $H_{TX}$ is a height of the transmitting end vehicle A; $H_{RX}$ is a height of the receiving end vehicle B; $\delta_{\phi}^{azi}$ represents a smooth change rate of the beam angle AoD in a pitch direction;

step 4, at the moment k=0, the transmitting end vehicle A calculating a forming vector $f_0$ of a transmitting beam and a forming vector $w_0$ of a receiving beam based on the rough estimates of the beam angles AoD and AoA, and transmitting a pilot signal q;

calculating the beam forming vector $f_0$ by using an estimate $a_t(\overline{\phi}_0^{azi}, \overline{\phi}_0^{ele})$ of a transmitting beam vector;

calculating the beam forming vector $w_0$ by using an estimate $a_r(\overline{\theta}_0^{azi}, \overline{\theta}_0^{ele})$ of a receiving beam vector;

step 5, starting from the moment k=1, judging whether the sudden rate of the beam angle of the transmitting end vehicle A meets $w^{(n)}[k]\neq 0$, and, if so, moving on to step 6, otherwise, moving on to step 7;

step 6, a current state of the transmitting end vehicle A is in a steering sudden change mode, calculating an observation value $\hat{y}_k$ of a received signal at the moment k with an equation as follow:

$$\hat{y}_k = \rho\alpha_k w^H(\overline{\theta}^{azi}, \overline{\theta}^{ele}) a_r(\theta_k^{azi}, \theta_k^{ele}) a_t^H(\phi_k^{azi}, \phi_k^{ele}) f(\overline{\phi}^{azi}, \overline{\phi}^{ele}) q \pm \tilde{n}_k;$$

wherein, $\rho\alpha_k$ is a channel gain of a path; $w^H(\overline{\theta}^{azi}, \overline{\theta}^{ele})$ represents a transpose matrix of a forming vector of a receiving beam; $f(\overline{\phi}^{azi}, \overline{\phi}^{ele})$ represents a forming vector of a transmitting beam; $a_r(\theta_k^{azi}, \theta_k^{ele})$ represents an estimate of the receiving beam vector; $a_t^H(\phi_k^{azi}, \phi_k^{ele})$ represents a transpose matrix of an estimate of the transmitting beam vector; $\tilde{n}[k]$ represents a white Gaussian noise vector during observation;

step 7, the current state of the transmitting end vehicle A is in a smooth change mode, calculating an observation value $\hat{p}_k$ of the received signal at the moment k with an equation as follows:

$$\hat{p}_k = \rho\alpha_k w_{k-1}^H a_r(\theta_k^{azi},\theta_k^{ele}) a_t^H(\phi_k^{azi},\phi_k^{ele}) f_{k-1} q + \tilde{n}_k$$

$w_{k-1}$ is a forming vector of a receiving beam at the moment k−1; $f_{k-1}$ is a forming vector of a transmitting beam at the moment k−1;

step 8, inputting the observation value $\hat{p}_k$ or the observation value $\hat{y}_k$ into an improved particle filter algorithm for fine beam estimation, to obtain optimal values $\tilde{x}_k$ of the beam angles AoD and AoA and an estimation mean square error k of a beam angle; specifically, first, starting from n=1 for particles, when $n<N_p$, generating particles $x^{*(n)}[k]\in N(\tilde{x}_k, u_k)$, and assigning a weight $$\tilde{w}^{(n)}[0] = \frac{1}{N_p},$$

$N_p$ being a total number of particles;

then, calculating an angle sudden change rate $w^{(n)}[k]$ based on a random process $c_k$ of a steering command and updating a state equation:

$$x[k] = \Phi x[k-1] + \Omega w[k] + u[k]$$

$$\Phi = \begin{bmatrix} P & O & O \\ O & E & Q \\ O & O & R \end{bmatrix}, \Omega = \begin{bmatrix} O \\ U \\ O \end{bmatrix}$$

wherein, $$u[k] = [\frac{1-\rho^2}{2}, \frac{1-\rho^2}{2}, \sigma_{\phi^{azi}}^2, \sigma_{\theta^{azi}}^2, \sigma_{\phi^{ele}}^2, \sigma_{\theta^{ele}}^2, \sigma_{\dot{\phi}^{azi}}^2, \sigma_{\dot{\theta}^{azi}}^2, \sigma_{\dot{\phi}^{ele}}^2, \sigma_{\dot{\theta}^{ele}}^2]^T$$

represents a white Gaussian noise vector: P=diag($\rho$, $\varphi$ represents a diagonal matrix of channel coefficients, represents a channel coefficient; E=diag(1, 1, 1, 1) represents a diagonal matrix of beam coefficients; R=diag($m_\phi$, $m_\theta$, $n_\phi$, $n_\theta$) represents a diagonal matrix of correlation coefficients of the beam angles AoD and AoA, $\{m_\phi, m_\theta, n_\phi, n_\theta\}\in(0,1)$; Q=diag ($\Delta t$, $\Delta t$, $\Delta t$, $\Delta t$) represents a diagonal matrix of correlation coefficients of iteration time differences; U=diag[$\Delta t$, $\Delta t$, 0, 0]$^T$ represents a diagonal matrix of correlation coefficients;

then, executing different particle weight updating strategies based on whether an angle change $w^{(n)}[k]$ is 0, if the condition $w^{(n)}[k]\neq 0$ is met, it is determined that the current state is in a steering sudden change mode; otherwise, it is determined that the current state is in a smooth change mode;

when it is in the smooth change mode, performing weight updating on the particles with the observation value $\hat{p}_k$ with an equation as follows:

$$\tilde{w}^{*(n)}[k] = \tilde{w}^{(n)}[k] \mathcal{L}(\hat{p}_k|s^{(n)}[k]);$$

$\tilde{w}^{(n)}[k]$ characterizes an initial weight of particles before updating the particles at the moment k; $s^{(n)}[k] \triangleq \{x^{(n)}[k], w^{(n)}[k]\}$ characterizes a state equation comprising the channel state vector, the smooth change rate of the beam angle and the sudden change rate of the beam angle at the moment k;

when it is in the steering sudden change mode, performing weight updating on the particles with the observation value $\hat{y}_k$ with an equation as follows:

$$\tilde{w}^{*(n)}[k] = \tilde{w}^{(n)}[k] \mathcal{L}(\hat{y}_k|s^{(n)}[k]);$$

then, performing weight normalization and resampling by using the updated particles:

$$\tilde{w}^{*(n)}[k] = \frac{\tilde{w}^{*(n)}[k]}{\sum_{j=1}^{N_p} \tilde{w}^{*(j)}[k]}$$

-continued $$\{x^{(j)}[k], \tilde{w}^{(j)}[k]\}_{j=1}^{N_P} = \text{Re sampling } \{x^{*(j)}[k], \tilde{w}^{*(j)}[k]\}_{j=1}^{N_P}$$

$x^{(j)}[k]$ represents a channel state vector of a $j^{th}$ particle; $\overline{w}^{(j)}[k]$ represents a particle weight of the $j^{th}$ particle;

finally, obtaining optimal values of the beam angles AoD and AoA by using the channel state vector and the updated particle weight:

$$\tilde{x}_k = \sum_{j=1}^{N_P} x^{(j)}[k] \tilde{w}^{(j)}[k]$$

$$u_k = \frac{1}{N_P} \sum_{j=1}^{N_P} \left(x^{(n)}[k] - \tilde{x}_k\right)^2$$

after obtaining an optimal value $x^{*(n)}[k] \in N(\tilde{x}_k, u_k)$ corresponding to a current particle, incrementing n by 1, and selecting a next particle to repeat the above process;

step 9, re-estimating a forming vector $f_k$ of a transmitting beam and a forming vector $w_k$ of a receiving beam by using the beam state optimal value $\tilde{x}_k$ and the estimation mean square error $u_k$ of the beam angle at the moment k, and transmitting the estimate of the forming vector $f_k$ of the transmitting beam to the transmitting end vehicle A for adjustment, so as to transmit a pilot signal q at the moment k+1 based on the adjusted forming vector $f_k$ of the transmitting beam;

step 10, returning to step 3, continuing to adjust the beam forming vector of each moment, until an error between an adjusted beam forming vector and an actual beam satisfies a set threshold range, so as to complete beam tracking.

2. The broadband millimeter wave beam tracking method based on vehicle movement trajectory recognition according to claim 1, wherein, the scenario in step 1 includes: two vehicles in communication (i.e., the transmitting end vehicle A, and the receiving end vehicle B), surrounding vehicles, and surrounding buildings; the two vehicles in communication are traveling at a corner of a two-dimensional road with three lanes, the vehicle A and the vehicle B both use a uniform planar millimeter wave phased antenna array module of a single Radio Frequency (RF) chain.

3. The broadband millimeter wave beam tracking method based on vehicle movement trajectory recognition according to claim 1, wherein, the sudden change rate $w^{(n)}[k]$ in step 5 is derived based on the steering angle $\beta_k$ between the transmitting antenna and the receiving antenna when the vehicle turns at the moment k and a curved lane radius r of the transmitting end vehicle A.

4. The broadband millimeter wave beam tracking method based on vehicle movement trajectory recognition according to claim 1, wherein, in step 8, for each transmission path, a discrete channel state vector is calculated based on the channel gain and the beam angle:

$$x[k] = [\alpha_{Re}[k], \alpha_{Im}[k], \varphi^{azi}[k], \varphi^{ele}[k], \delta_{\varphi^{azi}}[k], \delta_{\varphi^{ele}}[k]]^T$$

wherein, $\alpha_{Re}[k]$ represents a real component of the channel gain $\alpha[k]$, and $\alpha_{Im}[k]$ represents an imaginary component of the channel gain $\alpha[k]$.

5. A broadband millimeter wave beam tracking method based on vehicle movement trajectory recognition, wherein, the method is applied to a vehicle-to-vehicle V2V communication system, the vehicle-to-vehicle V2V communication system comprises a transmitting end vehicle and a receiving end vehicle capable of communicating with each other, the method comprises:

the receiving end vehicle determining a rough estimate of an Angle-of-Departure AoD of a transmitting beam of the transmitting end vehicle and a rough estimate of an Angle-of-Arrival AoA of a receiving beam of the receiving end vehicle at the moment k=0, based on a relative position between the transmitting end vehicle and the receiving end vehicle and attitude information of the transmitting end vehicle and the receiving end vehicle; wherein, the attitude information includes a steering angle between a transmitting antenna of the transmitting end vehicle and a receiving antenna of the receiving end vehicle;

the receiving end vehicle calculating a forming vector of a transmitting beam based on the rough estimate of AoD and calculating a forming vector of a receiving beam based on the rough estimate of AoA at the moment k=0, the transmitting end vehicle transmitting a pilot signal based on the forming vector of the transmitting beam;

the receiving end vehicle receiving the pilot signal based on the forming vector of the receiving beam, and starting from the moment k=1, judging whether a sudden change rate of AoD of the transmitting beam of the transmitting end vehicle is not equal to 0;

if so, determining that the transmitting end vehicle is in a steering sudden change mode, calculating a first observation value of the pilot signal transmitted by the transmitting end vehicle and received by the receiving end vehicle based on the forming vector of the transmitting beam and the forming vector of the receiving beam at the current moment k;

otherwise, determining that the transmitting end vehicle is in a smooth change mode, calculating a second observation value of the pilot signal transmitted by the transmitting end vehicle and received by the receiving end vehicle based on the forming vector of the transmitting beam and the forming vector of the receiving beam at the moment k−1;

the receiving end vehicle determining optimal values of the AoD and the AoA and an estimation mean square error of a beam angle based on the first observation value or the second observation value in accordance with a preset particle filter algorithm;

the receiving end vehicle adjusting the forming vector of the transmitting beam and the forming vector of the receiving beam based on the optimal values of the AoD and the AoA and the estimation mean square error of the beam angle, and transmitting the adjusted forming vector of the transmitting beam to the transmitting end vehicle;

the transmitting end vehicle transmitting a pilot signal based on the adjusted forming vector of the transmitting beam at the moment k+1;

the receiving end vehicle receiving the pilot signal based on the adjusted forming vector of the receiving beam at the moment k+1, and returning to the step of judging whether the sudden change rate of AoD of the transmitting beam of the transmitting end vehicle is not equal to 0, until an error between the adjusted forming vector of the transmitting beam and an actual transmitting beam satisfies a preset threshold range.

6. The method according to claim 5, wherein, determining optimal values of the AoD and the AoA and the estimation mean square error of the beam angle based on the first observation value or the second observation value in accordance with a preset particle filter algorithm comprises:

starting from n=1, when n≤$N_p$, generating a particle $x^{*(n)}[k] \in N(\tilde{x}_k, u_k)$ based on the rough estimate of AoD and the rough estimate of AoA, and assigning an initial weight $$\tilde{w}^{(n)}[0] = \frac{1}{N_p}$$

to the current particle;

updating the current particle based on the sudden change rate of AoD of the transmitting beam of the transmitting end vehicle, and the updated particle being:

$$x^{*(n)}[k] \Phi x^{*(n)}[k-1] + \Omega w^{(n)}[k] + u^{(n)}[k]$$

when it is determined that the transmitting vehicle is in the steering sudden change mode, updating the weight of the current particle based on the first observation value, the updated weight of the current particle being:

$$\tilde{w}^{*(n)}[k] = \tilde{w}^{(n)}[k] \mathcal{L}(\hat{p}_k | s^{(n)}[k])$$

when it is determined that the transmitting vehicle is in the smooth change mode, updating the weight of the current particle based on the second observation value, the updated weight of the current particle being:

$$\tilde{w}^{*(n)}[k] = \tilde{w}^{(n)}[k] \mathcal{L}(\hat{y}_k | s^{(n)}[k])$$

setting n=n+1, generating a next particle, and returning to the step of assigning an initial weight to the current particle;

normalizing an updated weight of each of the particles, and resampling the updated particles and normalized weights;

determining the optimal values of the AoD and the AoA and the estimation mean square error of the beam angle based on resampling results;

wherein, $\tilde{x}_k$ are the optimal values of the AoD and the AoA, $u_k$ is the estimation mean square error of the beam angle, $N_p$ represents a total number of particles, $u^{(n)}[k]$ represents a white Gaussian noise vector, $\hat{p}_k$ is the first observation value, $\hat{y}_k$ is the second observation value, $s^{(n)}[k]$ represents a state equation comprising a channel state vector of a communication channel between the transmitting end vehicle and the receiving end vehicle, a smooth change rate of the AoD, and a sudden change rate of the AoD at the moment k;

$$\Phi = \begin{bmatrix} P & O & O \\ O & E & Q \\ O & O & R \end{bmatrix}, \Omega = \begin{bmatrix} O \\ U \\ O \end{bmatrix},$$

P represents a diagonal matrix of channel coefficients of the communication channel, E represents a diagonal matrix of coefficients of the beam angles AoD and AoA; R represents a diagonal matrix of correlation coefficients of the AoD and the AoA, Q represents a diagonal matrix of correlation coefficients of iteration time differences; U represents a diagonal matrix of correlation coefficients.

7. The method according to claim 5, wherein, calculation formulas of a horizontal component of the rough estimate of AoD and a horizontal component of rough estimate of AoA are:

$$\begin{cases} \hat{\theta}_k^{azi} = \hat{\phi}_k^{azi} \pm \beta_k \\ \hat{\phi}_k^{azi} = \arctan\left(\frac{p_{TX,y}[k-1] - p_{RX,y}[k-1]}{p_{TX,x}[k-1] - p_{RX,x}[k-1]}\right) + \delta_{\phi^{azi}}[k]\Delta t \\ \beta_k = \beta_{k-1} + w[k]\Delta t \end{cases}$$

wherein $\theta^{azi}[k]$ is the horizontal component of the rough estimate of the AoA at the moment k, $\phi^{azi}[k]$ is the horizontal component of the rough estimate of the AoD at the moment k, $\beta_k$ is the steering angle between the transmitting antenna of the transmitting end vehicle and the receiving antenna of the receiving end vehicle, $\delta_{\phi^{azi}}[k]$ represents a smooth change rate of the AoD in a horizontal direction at the moment k, $\Delta t$ represents a time interval between adjacent moments k and k−1; w[k] is a sudden change rate of the AoD of the transmitting end vehicle at the moment k; ($p_{TX,x}[k-1]$, $p_{TX,y}[k-1]$) is a position of the transmitting end vehicle at the moment k; ($p_{RX,x}[k-1]$, $p_{RX,y}[k-1]$) is a position of the receiving end vehicle at the moment k;

calculation formulas of a pitch component of the rough estimate of the AoD and of a pitch component of the rough estimate of the AoA are:

$$\begin{cases} |\hat{\theta}_{l,k}^{ele}| = |\hat{\phi}_{l,k}^{ele}| = \arctan\frac{|H_{TX} - H_{RX}|}{d_{TX,RX}[k-1]} + \delta_{\phi^{ele}}[k]\Delta t \\ \hat{\theta}_{l,k}^{ele} = -\hat{\phi}_{l,k}^{ele} \end{cases}$$

wherein $\hat{\theta}_{l,k}^{ele}$ is the pitch component of the rough estimate of the AoA on a $l^{th}$ path at the moment k; $\hat{\phi}_{l,k}^{ele}$ is the pitch component of the rough estimate of the AoD on the $l^{th}$ path at the moment k; $H_{TX}$ is a height of the transmitting end vehicle; $H_{RX}$ is a height of the receiving end vehicle; $d_{TX,RX}[k-1]$ is a horizontal distance between the transmitting end vehicle and the receiving end vehicle at the moment k−1, $\delta_{\phi^{ele}}[k]$ represents a smooth change rate of the AoD in a pitch direction at the moment k, $\Delta t$ represents a time interval between the moment k and the moment k−1.

8. The method according to claim 5, wherein, the first observation value is:

$$\hat{y}_k = \rho\alpha_k w^H(\bar{\theta}^{azi}, \bar{\theta}^{ele}) a_r(\theta_k^{azi}, \theta_k^{ele}) a_t^H (\phi_k^{azi}, \phi_k^{ele}) f(\bar{\phi}^{azi}, \bar{\phi}^{ele}) q \pm \tilde{n}_k;$$

wherein, $\hat{y}_k$ represents the first observation value at the moment k, $\rho\alpha_k$ represents a channel gain of the channel path established between the transmitting end vehicle and the receiving end vehicle at the moment k; $w^H(\bar{\theta}^{azi}, \bar{\theta}^{ele})$ represents a conjugate transpose matrix of a forming vector of a receiving beam; $a_r(\theta_k^{azi}, \theta_k^{ele})$ represents an estimate of the receiving beam vector at the moment k; $\theta_k^{azi}$ represents the horizontal component of AoD at the moment k; $\theta_k^{ele}$ represents the pitch component of AoA at the moment C: $a_t^H(\phi_k^{azi}, \phi_k^{ele})$ represents a conjugate transpose matrix of an estimate of the transmitting beam vector; $\phi_k^{azi}$ represents a horizontal component of AoD at the moment k; $\phi_k^{ele}$ represents the pitch component of AoD at the moment k; $f(\bar{\phi}^{azi}, \bar{\phi}^{ele})$ represents the forming vector of the transmitting beam; q represents a pilot signal, ñ[k] represents a white Gaussian noise vector at the moment k;

the second observation value is:

$$\hat{p}_k = \rho\alpha_k w_{k-1}^H a_r(\theta_k^{azi}, \theta_k^{ele}) a_t^H(\phi_k^{azi}, \phi_k^{ele}) f_{k-1} q + \tilde{n}_k$$

wherein, $\hat{p}_k$ represents the second observation value at the moment k, $\rho\alpha_k$ is a channel gain of the channel path established between the transmitting end vehicle and the receiving end vehicle at the moment k; $w_{k-1}^H$ represents a conjugate transpose matrix of a forming vector of a receiving beam at the moment k−1; $a_r(\theta_k^{azi}, \theta_k^{ele})$ represents an estimate of the receiving beam vector at the moment k; $\theta_k^{azi}$ represents the horizontal component of AoD at the moment k; $\theta_k^{ele}$ represents the pitch component of AoA at the moment k; $a_t^H(\phi_k^{azi}, \theta_k^{ele})$ represents a conjugate transpose matrix of an estimate of the transmitting beam vector; $\phi_k^{azi}$ represents a horizontal component of the AoD at the moment k; $\phi_k^{ele}$ represents the pitch component of the AoD at the moment k; $f_{k-1}$ represents the forming vector of the transmitting beam at the moment k−1; q represents a pilot signal, ñ[k] represents a white Gaussian noise vector at the moment k.

9. The method according to claim 5, wherein, the transmitting end vehicle and the receiving end vehicle are traveling at a corner of a two-dimensional road, the transmitting end vehicle and the receiving end vehicle both use a uniform planar millimeter wave phased antenna array module.

10. The method according to claim 7, wherein, the sudden change rate $w^{(n)}[k]$ of the AoD at the moment k is derived based on the steering angle $\beta_k$ between the transmitting antenna of the transmitting end vehicle and the receiving antenna of the receiving end vehicle at the moment k and a curved lane radius r of a lane on which the transmitting end vehicle is traveling.

11. A vehicle, comprising at least one processor; and a memory connected in communication with the at least one processor; wherein, the memory stores instructions executable by the at least one processor, the instructions when being executed by the at least one processor, cause the at least one processor to implement the method of claim 5.

12. A non-transitory computer-readable storage medium storing computer instructions, wherein the computer instructions are used to cause the computer to implement the method of claim 5.

* * * * *

UNITED STATES PATENT AND TRADEMARK OFFICE
CERTIFICATE OF CORRECTION

PATENT NO. : 12,407,386 B2  
APPLICATION NO. : 18/026433  
DATED : September 2, 2025  
INVENTOR(S) : Qixun Zhang et al.

Page 1 of 1

It is certified that error appears in the above-identified patent and that said Letters Patent is hereby corrected as shown below:

In the Claims

Claim 1, Column 21, Line 67, should read –square error $U_K$, of a beam angle; specifically,–

Claim 1, Column 22, Line 28, should read –represents a white Gaussian noise vector: P=diag(p, p)–

Claim 1, Column 22, Line 30, should read –ρ represents a channel coefficient E=diag(1,1,1,1)–

Claim 3, Column 23, Line 51, should read –vehicle turns at the moment $k$ and a curved lane radius $r$ of–

Signed and Sealed this  
Twenty-fifth Day of November, 2025

John A. Squires  
*Director of the United States Patent and Trademark Office*